United States Patent
Icho et al.

(10) Patent No.: US 8,154,616 B2
(45) Date of Patent: Apr. 10, 2012

(54) DATA PROCESSING APPARATUS AND METHOD, AND RECORDING MEDIUM

(75) Inventors: Keiji Icho, Osaka (JP); Masayuki Misaki, Hyogo (JP); Takashi Kawamura, Kyoto (JP); Kuniaki Isogai, Osaka (JP); Ryouichi Kawanishi, Osaka (JP); Jun Ohmiya, Kyoto (JP); Hiromichi Nishiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 506 days.

(21) Appl. No.: 12/522,944

(22) PCT Filed: Jan. 16, 2008

(86) PCT No.: PCT/JP2008/050432
§ 371 (c)(1),
(2), (4) Date: Jul. 13, 2009

(87) PCT Pub. No.: WO2008/087974
PCT Pub. Date: Jul. 24, 2008

(65) Prior Publication Data
US 2010/0097483 A1   Apr. 22, 2010

(30) Foreign Application Priority Data
Jan. 16, 2007 (JP) ................. 2007-006689

(51) Int. Cl.
*H04N 5/232* (2006.01)
*H04N 5/228* (2006.01)
*H04N 7/00* (2011.01)
*G06K 9/00* (2006.01)

(52) U.S. Cl. ........... 348/222.1; 348/211.1; 348/211.2; 348/211.3; 348/211.4; 348/211.5; 348/211.6; 348/211.7; 348/211.8; 348/211.9; 348/211.11; 382/103; 382/104

(58) Field of Classification Search .. 348/211.1–211.11, 348/222.1, 159, 142, 36; 382/103, 104
See application file for complete search history.

(56) References Cited

U.S. PATENT DOCUMENTS
5,164,827 A * 11/1992 Paff .............................. 348/143
2001/0013865 A1   8/2001 Kamei

FOREIGN PATENT DOCUMENTS
| JP | 10-239416 | 9/1998 |
| JP | 10-243285 | 9/1998 |
| JP | 2002-185939 | 6/2002 |
| JP | 2002-330421 | 11/2002 |
| JP | 2005-86579 | 3/2005 |

OTHER PUBLICATIONS
International Search Report issued Feb. 26, 2008 in the International (PCT) Application of which the present application is the U.S. National Stage.

* cited by examiner

*Primary Examiner* — Jason Chan
*Assistant Examiner* — Joel Fosselman
(74) *Attorney, Agent, or Firm* — Wenderoth, Lind & Ponack, L.L.P.

(57) ABSTRACT

A data processing apparatus acquires images captured by cameras. A data processing apparatus 2 calculates relative positional relationship between the camera that captured an image and a camera that is captured in the captured image, by image recognition of the captured image. The data processing apparatus 2 aggregates positional relationships calculated for the captured images, respectively, and by having one camera as reference, calculates the relative positions and directions of other cameras. Based on the calculated results, a user interface for supporting selection of the captured image by a user is generated.

22 Claims, 25 Drawing Sheets

FIG. 8

| CAPTURE TIME | CAPTURING CAMERA IDENTIFICATION INFORMATION | CAPTURED CAMERA IDENTIFICATION INFORMATION | CAPTURED CAMERA COORDINATES | CAPTURED CAMERA DIRECTION |
|---|---|---|---|---|
| 9:10.15 | A | B | (1, 3) | 120° |
| 9:10.15 | A | C | (-1, 2) | 180° |
| 9:10.15 | B | D | (-1.5, 3) | 225° |
| 9:10.15 | C | A | (1, 3) | 180° |
| 9:10.15 | D | F | (2, 2) | 135° |
| 9:10.15 | E | A | (3, 6) | 260° |
| 9:10.15 | E | G | (-1, 3) | 100° |

FIG. 10

| NUMBER | CAPTURING CAMERA IDENTIFICATION INFORMATION | CAPTURED CAMERA IDENTIFICATION INFORMATION | CAPTURED CAMERA COORDINATES | CAPTURED CAMERA DIRECTION |
|---|---|---|---|---|
| 1 | B | D | (-1.5, 3) | 225° |
| 2 | C | A | (1, 3) | 180° |
| 3 | D | F | (2, 2) | 135° |
| 4 | E | A | (3, 6) | 260° |
| 5 | E | G | (-1, 3) | 100° |

FIG. 11

| TIME | REFERENCE CAMERA | TARGET CAMERA | RELATIVE POSITION | RELATIVE DIRECTION |
|---|---|---|---|---|
| 9:10.15 | A | B | (1, 3) | 120° |
| 9:10.15 | A | C | (-1, 2) | 180° |

RELATIVE POSITION INFORMATION

FIG. 17
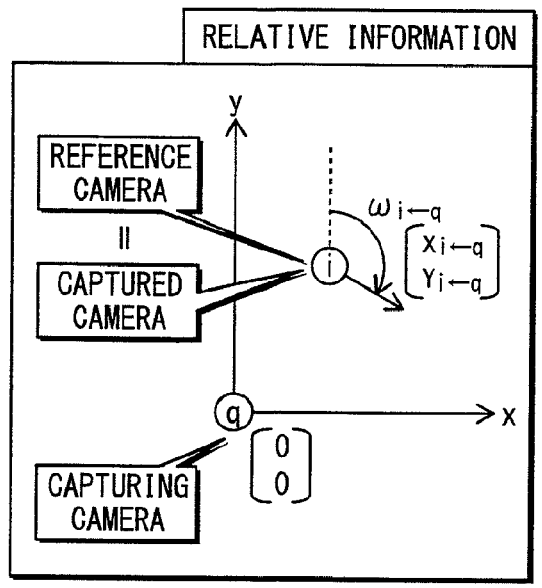
CALCULATE INVERSE VECTOR
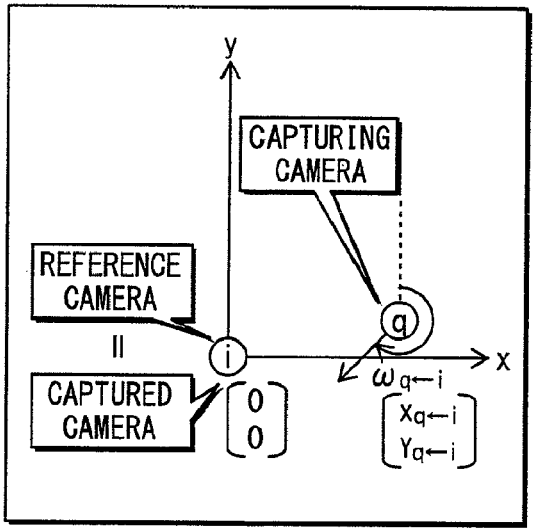
$$\begin{bmatrix} X_{q \leftarrow i} \\ Y_{q \leftarrow i} \end{bmatrix} = \begin{bmatrix} \cos \omega_{i \leftarrow q} & -\sin \omega_{i \leftarrow q} \\ \sin \omega_{i \leftarrow q} & \cos \omega_{i \leftarrow q} \end{bmatrix} \begin{bmatrix} -X_{i \leftarrow q} \\ -Y_{i \leftarrow q} \end{bmatrix}$$
$\omega_{q \leftarrow i} = 360 - \omega_{i \leftarrow q}$

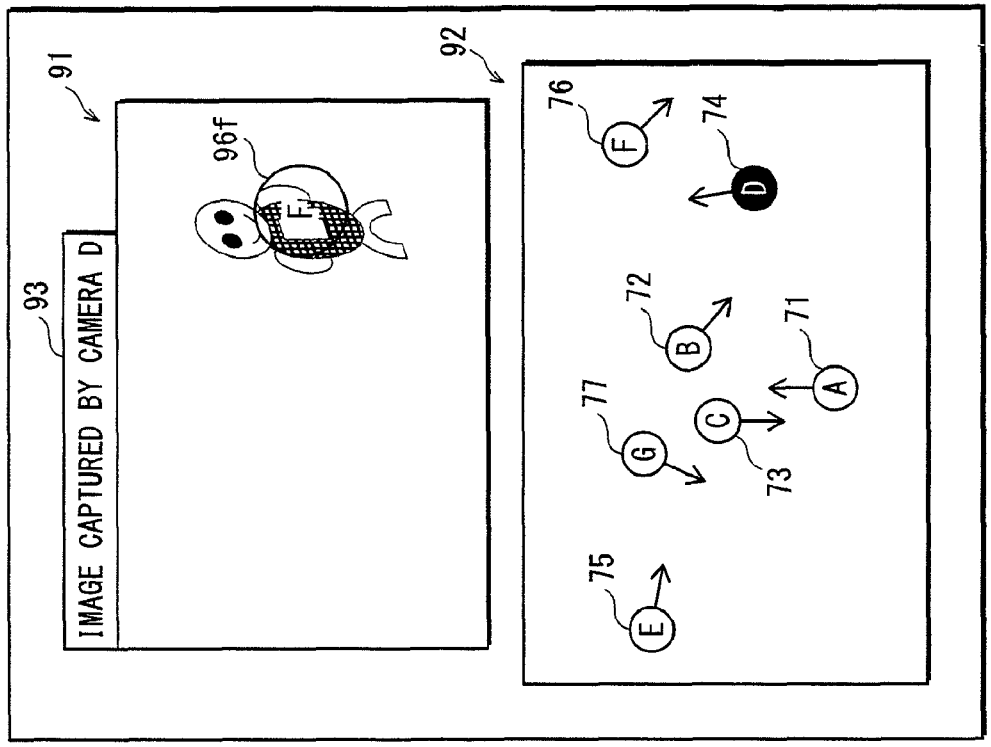
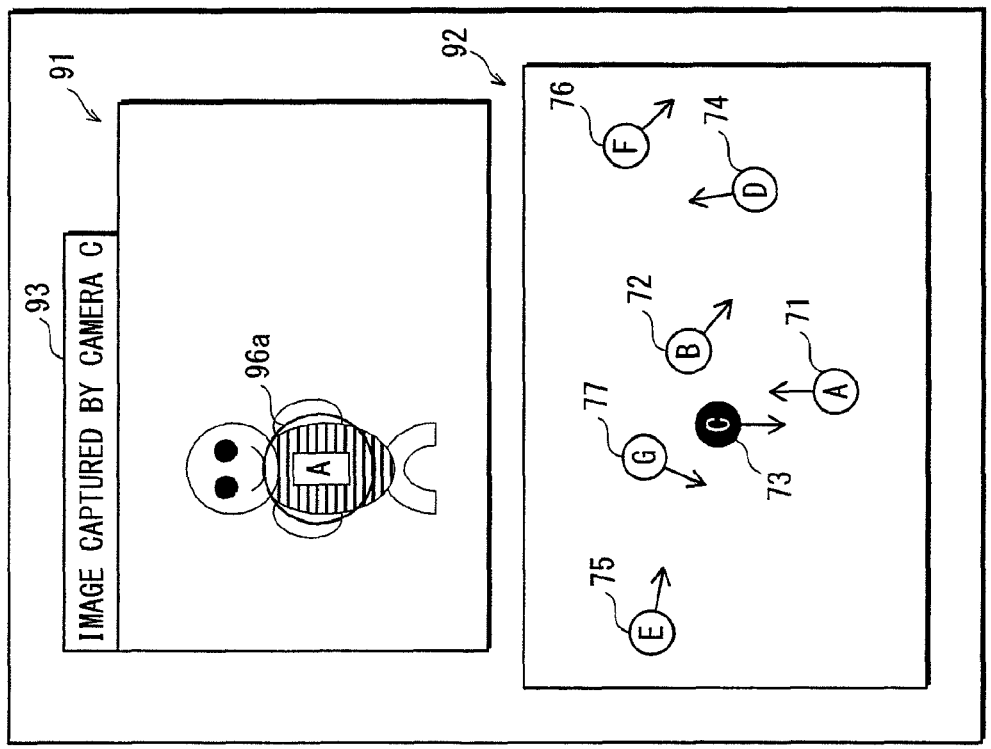
FIG. 21

FIG. 23
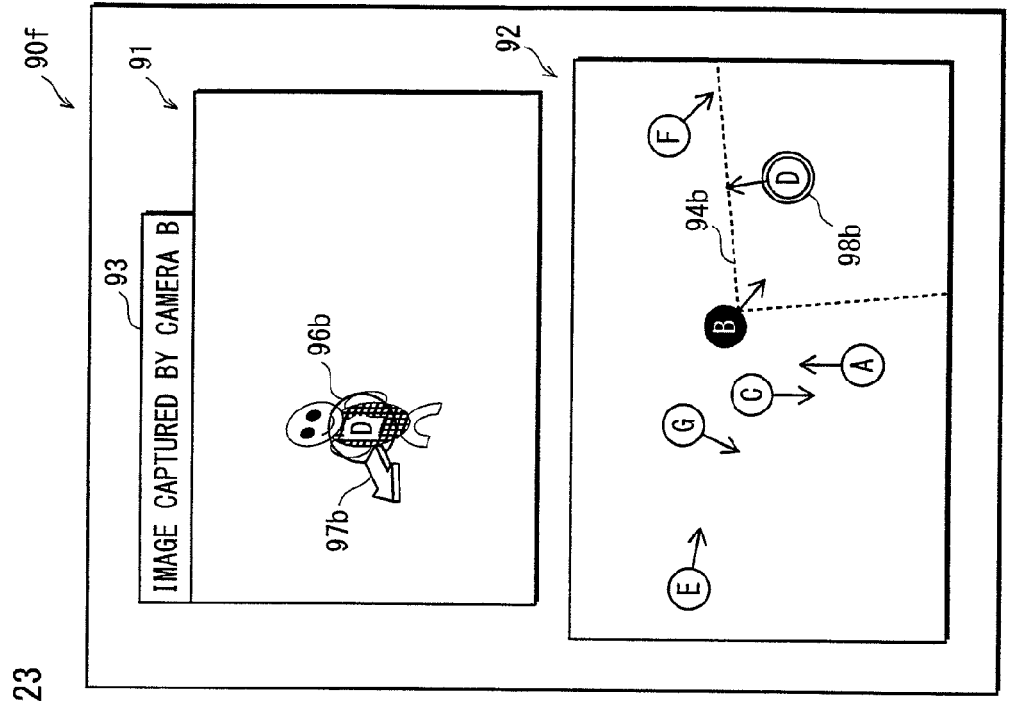
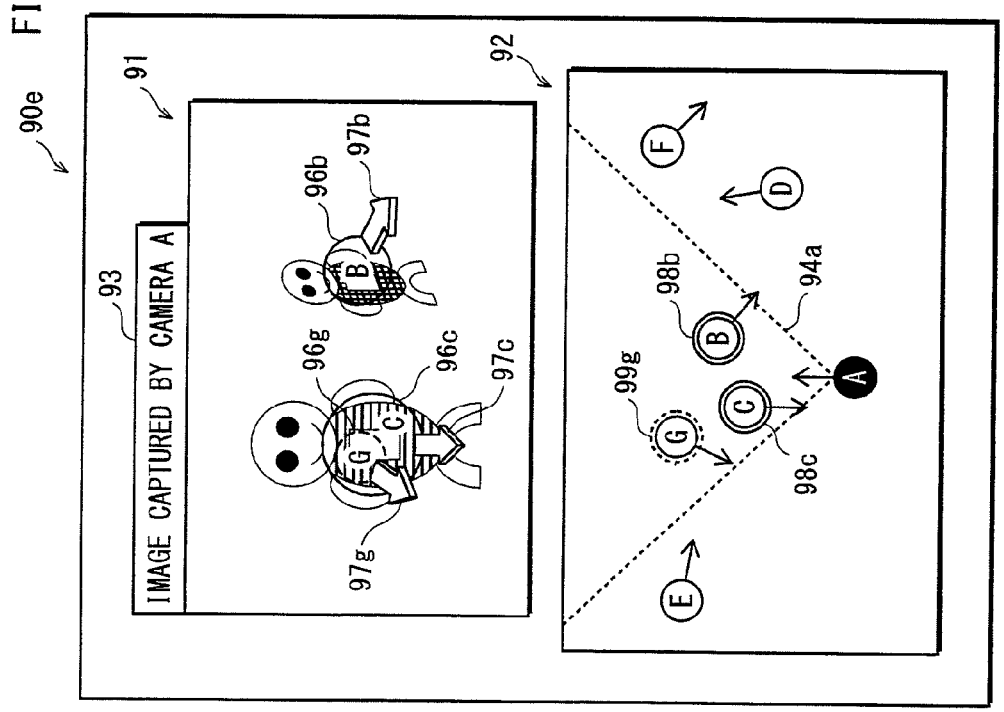

DATA PROCESSING APPARATUS AND METHOD, AND RECORDING MEDIUM

TECHNICAL FIELD

The present invention relates to a technique to calculate positional relationships among a plurality of cameras and a technique to generate a user interface based on the calculated positional relationships.

BACKGROUND ART

In a situation where multiple cameras capture or are able to capture images of one another, information indicating positional relationships among these cameras can be useful.

For example, in a case where moving objects (e.g., people) are each equipped with a wearable camera and perform image capturing while moving around (e.g., each participant of a meeting or a party wearing a camera), each camera may change its image-capturing subject from time to time without capturing a particular subject continuously. In this case, a review of a captured image does not provide a user with information on what is not captured in the image, such as what is hidden behind an object captured in the image. However, if positional relationships among the cameras are known, the user can easily identify which camera is capturing what is behind the object, and also can have a view of the place where the image-capturing is performed, from a different angle.

While the above is merely one example of an advantage, information indicating positional relationships among cameras can be available for various uses, and accordingly, there is a need to facilitate generation of such information.

To fulfill the need, the following methods may be applied.

For example, positions of the cameras in a global coordinate system are determined using base stations conducting a wireless communication or using GPS (Global Positioning System). Once the positions of the cameras in the global coordinate system are determined, positional relationships among the cameras can be calculated with use of the determined positions. It should be noted that a technique for determining current positions using base stations is disclosed in Patent Documents 1 and 2 below.

Patent Document 1: Japanese Patent Application Publication No. H10-239416

Patent Document 2: Japanese Patent Application Publication No. 2005-86579

DISCLOSURE OF THE INVENTION

Problems the Invention is going to Solve

However, determining positions in the global coordinate system requires GPS or base stations. In other words, at indoor, underground, or other areas where signals from satellites cannot be received, it is difficult to calculate positional relationships using GPS. Also, to determine positions using base stations, appropriate installations of the base stations are necessary.

Thus, the present invention aims to provide a data processing apparatus able to calculate positional relationships among cameras without using means such as GPS or base stations to determine positions in the global coordinate system.

Means of Solving the Problems

In order to solve the above-stated problem, one aspect of the present invention is a data processing apparatus for managing a positional relationship among a plurality of cameras that are related to one another by performing image capturing so that each of the plurality of cameras captures an image of another one or more of the plurality of cameras. The data processing apparatus includes a captured image acquisition unit operable to acquire a plurality of different pieces of captured image data which have been captured by the plurality of cameras; an image recognition unit operable to perform image recognition processing on each of the pieces of captured image data to detect one or more predetermined pieces of detection target data each for identifying a captured camera, the captured camera being captured in the piece of captured image data which has been captured by a capturing camera, and the captured camera and the capturing camera being included in the plurality of cameras; a calculation unit operable to obtain, for each of the detected pieces of detection target data, by performing calculation based on the piece of detection target data, a piece of relative information indicating coordinates and a capturing direction of a position-specified camera in a coordinate system of an origin camera, the origin camera being one of the capturing camera and the captured camera, and the position-specified camera being an other one of the capturing camera and the captured camera; a judgement unit operable to judge, for each piece of relative information, whether the piece of relative information is to be converted to apiece of information which uses a coordinate system of a reference camera among the plurality of cameras; a relative information conversion operation unit operable to perform the conversion in accordance with a result of the judgement by the judgement unit; and a relative position information management unit operable to aggregate, (a) among the obtained pieces of relative information, each unconverted piece of relative information which uses the coordinate system of the reference camera, and (b) the converted pieces of relative information, thereby generating a piece of relative position information indicating coordinates and a capturing direction of each of the plurality of cameras in the coordinate system of the reference camera.

Effects of the Invention

The above-stated data processing apparatus first calculates, for each piece of captured image data, by image recognition, a positional relationship between a capturing camera which has captured the piece of captured image data, and each captured cameras whose image is captured in the piece of captured image data. As a result of the calculation, one or more pieces of relative information are generated.

Positional relationships among the cameras can be calculated using these pieces of information. For example, assume that a piece of relative information indicates a positional relationship between a camera 1 and a camera 2, and another piece of relative information indicates a positional relationship between the camera 2 and a camera 3. In this case, a positional relationship between the camera 2 and the camera 3 can be calculated by synthesizing these pieces of relative information. By repeating such processing, positional relationships among the cameras can be calculated.

With the stated judgement unit, the above-stated data processing apparatus can convert each piece of relative information using the relative information conversion operation unit if necessary. Such conversion enables the synthesizing mentioned above, and as a result, information (relative position information) indicating coordinates and a capturing direction, based on a coordinate system of one of the plurality of cameras, of each of the other cameras.

Accordingly, the above-described data processing apparatus is able to calculate positional relationships among cameras without having a structure to communicate with the outside, such as GPS or a base station. In other words, requirements for calculating positional relationships among cameras are alleviated.

In the above-stated structure, specifically, the judgement unit judges whether the piece of relative information uses the coordinate system of the reference camera, and if the judgement is negative and at least one of the capturing camera and the captured camera satisfies a predetermined condition, the judgement unit judges that the conversion is to be performed.

With the stated structure, each piece of relative information other than those pieces based on the captured images captured by the reference camera can be also used for generating the piece of relative position information.

In the above-stated structure, it is preferable that the relative position information management unit hold the piece of relative position information and update the held piece of relative position information by sequentially receiving, for each of the plurality of cameras, a piece of reference information indicating coordinates and a capturing direction of the camera in the coordinate system of the reference camera, the judgement unit include a data management unit operable to hold the obtained pieces of relative information, and the judgement unit sequentially read each piece of relative information held by the data management unit, and if both of the capturing camera and the captured camera of the read piece of relative information are none of (a) the reference camera and (b) any camera, among the plurality of cameras, for which no piece of reference information is registered in the piece of relative position information, the judgement unit return the read piece of relative information to the data management unit.

Even if a piece of relative information cannot be used for generating the piece of relative position information, if a positional relationship between another one of the plurality of cameras and the reference camera has been already calculated, information can be added to the piece of relative position information using the piece of relative information pertaining to the another camera.

With the stated structure, when a piece of relative information cannot be used for generating the piece of relative position information, the piece of relative information is returned to the data management unit once. Accordingly, positional relationships among the cameras can be determined more accurately.

Also, the relative position information management unit may hold the piece of relative position information and update the held piece of relative position information by sequentially receiving, for each of the plurality of cameras, a piece of reference information indicating coordinates and a capturing direction of the camera in the coordinate system of the reference camera, and the judgement unit may register, as the piece of reference information, a positional relationship between the capturing camera and the captured camera indicated in the piece of relative information if (i) the origin camera is the reference camera and (ii) no piece of reference information is registered for the position-specified camera in the piece of relative position information.

With the stated structure, the relative position information can be efficiently generated.

In the above-stated structure, the judgement unit may discard the piece of relative information without adding the piece of relative information to the piece of relative position information if (i) the origin camera is the reference camera and (ii) the piece of reference information for the position-specified camera is registered in the piece of relative position information.

With the stated structure, information which has already been registered in the piece of relative position information is prevented from being registered again, thereby keeping the piece of relative position information from becoming redundant.

Also, specifically, the relative position information management unit holds the piece of relative position information and updates the held piece of relative position information by sequentially receiving, for each of the plurality of cameras, a piece of reference information indicating coordinates and a capturing direction of the camera in the coordinate system of the reference camera, and the judgement unit judges that the conversion is to be performed if (i) the piece of reference information for the origin camera is registered in the piece of relative position information and (ii) the position-specified camera is not the reference camera.

In this case, the relative information conversion operation unit may convert, with use of a positional relationship between the reference camera and the origin camera indicated in the piece of reference information, the piece of relative information to the piece of information indicating coordinates and/or a capturing direction of the position-specified camera in the coordinate system of the reference camera.

With the stated structure, when the positional relationship between the capturing camera and the reference camera is known, coordinates and a direction of the captured camera, which has been captured by the capturing camera, in the coordinate system of the reference camera can be registered in the relative position information.

Additionally, the judgement unit may discard the piece of relative information without adding the piece of relative information to the piece of relative position information if (i) the piece of reference information for the origin camera is registered in the piece of relative position information and (ii) the position-specified camera is the reference camera.

With the stated structure, information which has already been registered in the piece of relative position information is prevented from being registered again, thereby keeping the piece of relative position information from becoming redundant.

Also, specifically, the relative position information management unit holds the piece of relative position information and updates the held piece of relative position information by sequentially receiving, for each of the plurality of cameras, a piece of reference information indicating coordinates and a capturing direction of the camera in the coordinate system of the reference camera, and the judgement unit judges that the conversion is to be performed if (i) the position-specified camera is the reference camera and (ii) no piece of reference information is registered for the origin camera in the piece of relative position information.

In this case, the relative information conversion operation unit may convert the piece of relative information to the piece of information indicating coordinates and/or a capturing direction of the original camera in the coordinate system of the reference camera, by calculating an inverse vector of a positional relationship between the origin camera and the position-specified camera indicated in the piece of relative information.

With the stated structure, coordinates and a direction of the capturing camera, which has captured the reference camera, in the coordinate system of the reference camera can be registered in the relative position information.

Also, specifically, the relative information conversion operation unit converts the piece of relative information to the piece of information indicating coordinates and/or a capturing direction of the original camera in the coordinate system of the reference camera, by calculating an inverse vector of a positional relationship between the origin camera and the position-specified camera indicated in the piece of relative information.

In this case, the relative information conversion operation unit may convert the piece of relative information to the information indicating coordinates and a capturing direction of the origin camera in the coordinate system of the reference camera, by performing a vector operation using (a) a positional relationship between the position-specified camera and the original camera indicated in the piece of reference information and (b) a positional relationship between the capturing camera and the captured camera indicated in the piece of relative information.

With the stated structure, when the capturing camera has captured a camera whose positional relationship with the reference camera is known, coordinates and a direction of the capturing camera in the coordinate system of the reference camera can be registered in the relative position information.

Here, the generated piece of relative position information may be used in the following manner.

That is to say, the above-described data processing apparatus may further include an image selection support unit operable to generate, based on the generated piece of relative position information, image data indicating coordinates and a capturing direction of each of the plurality of cameras in the coordinate system of the reference camera, and causes, with use of the generated image data, a display unit to display a user interface for making a selection with respect to the plurality of pieces of captured image data.

With the stated structure, the data processing apparatus is able to support the user to make a selection with respect to the plurality of pieces of captured image data.

Also, in this case, the user interface may include: a camera positional relationship display area for displaying the generated image data; and a captured image display area for displaying one of the plurality of pieces of captured image data which has been captured by a camera selected via the user interface, and the image selection support unit may include: a position specification unit operable to specify a position, in the displayed piece of captured image data, of a camera located within an image-capturing range of the capturing camera of the displayed piece of captured image data; and an overlay display unit operable to overlay a camera identification image, which is for identifying the camera, on top of the piece of captured image data so as to display the camera identification image at a position determined based on the specified position.

With the stated structure, the user interface enables the user to easily recognize which camera is the captured camera captured in the captured image data.

Also, in this case, the image selection support unit, upon receiving an operation of selecting the overlaid camera identification image, may display, in the captured image display area, the captured image which has been captured by the camera identified by the selected camera identification image.

Also, the overlay display unit may assign different colors to the plurality of cameras, respectively, and overlay a camera identification image of each of the plurality of cameras, using a color assigned to the camera, on top of the camera, and the image selection support unit generates the image data such that each camera identification image indicating a respective one of the plurality of cameras is displayed in a visually distinct manner by the color assigned to the camera.

Additionally, the overlay display unit may display the camera identification image in a mode in accordance with a distance between the camera indicated by the camera identification image and the capturing camera which captured the captured image data such that the distance is visually distinct.

Also, in this case, the position specification unit may perform the specification based on (i) at least one of (a) coordinates and a capturing direction of each of the plurality of cameras indicated in the relative position information whose reference camera is the capturing camera of the displayed captured image data and (b) the piece of relative information whose origin camera is the capturing camera and (ii) capturing range information indicating the image-capturing range of the capturing camera.

With the stated structure, the specification is performed based on the coordinates of each camera. Accordingly, when the relative position information is used to perform the specification, the position of each camera whose image is not captured in the captured image data can also be displayed in the captured image data.

Further, the position specification unit may judge whether each camera within the image-capturing range is (a) the captured camera whose image has been captured in the captured image data or (b) an uncaptured camera whose image has not been captured in the captured image data, based on the coordinates of each of the plurality of cameras indicated in the relative position information, and the overlay display unit overlays, for display, the camera identification image in a manner that each camera within the image-capturing range is visually distinguishable between the captured camera and the hidden camera.

With the stated structure, the data processing apparatus can make the user easily recognize that there exists a camera whose image is not captured in the captured image data.

Also, the relative position information management unit may hold the piece of relative position information and update the held piece of relative position information by sequentially receiving, for each of the plurality of cameras, a piece of reference information indicating coordinates and a capturing direction of the camera based on the coordinate system of the reference camera, and the data processing apparatus may generate a piece of relative position information at each predetermined time, and in a case the plurality of cameras include an undetermined camera for which no piece of reference information exists in the piece of relative position information at the predetermined time, interpolate coordinates and a capturing direction of the undetermined camera in the coordinate system of the reference camera at the predetermined time, in accordance with (a) coordinates and a capturing direction of the undetermined camera in the coordinate system of the reference camera indicated in a piece of relative information at a time prior to the predetermined time and (b) coordinates and a capturing direction of the undetermined camera in the coordinate system of the reference camera indicated in a piece of relative information at a time subsequent to the predetermined time.

With the stated structure, even if there is a camera whose positional relationship is undetermined at a given time, the positional relationship can be interpolated using relative position information before and after the given time.

Another aspect of the present invention is a data processing method for managing a positional relationship among a plurality of cameras that are related to one another by performing image capturing so that each of the plurality of cameras captures an image of another one or more of the plurality of cameras. The data processing method includes: a captured image acquiring step of acquiring a plurality of different pieces of captured image data which have been captured by the plurality of cameras; an image recognizing step of performing image recognition processing on each of the pieces of captured image data to detect one or more predetermined pieces of detection target data each for identifying a captured camera, the captured camera being captured in the piece of captured image data which has been captured by a capturing camera, and the captured camera and the capturing camera being included in the plurality of cameras; a calculating step of obtaining, for each of the detected pieces of detection target data, by performing calculation based on the piece of detection target data, a piece of relative information indicating coordinates and a capturing direction of a position-specified camera in a coordinate system of an origin camera, the origin camera being one of the capturing camera and the captured camera, and the position-specified camera being an other one of the capturing camera and the captured camera; a judging step of judging, for each piece of relative information, whether the piece of relative information is to be converted to a piece of information which uses a coordinate system of a reference camera among the plurality of cameras; a relative information conversion operating step of performing the conversion in accordance with a result of the judgement in the judging step; and a relative position information managing step of aggregating, (a) among the obtained pieces of relative information, each unconverted piece of relative information which uses the coordinate system of the reference camera, and (b) the converted pieces of relative information, thereby generating a piece of relative position information indicating coordinates and a capturing direction of each of the plurality of cameras in the coordinate system of the reference camera.

Another aspect of the present invention is a computer-readable recoding medium having recorded thereon a control program for causing a data processing apparatus to execute steps for managing a positional relationship among a plurality of cameras that are related to one another by performing image capturing so that each of the plurality of cameras captures an image of another one or more of the plurality of cameras. The control program includes: a captured image acquiring step of acquiring a plurality of different pieces of captured image data which have been captured by the plurality of cameras; an image recognizing step of performing image recognition processing on each of the pieces of captured image data to detect one or more predetermined pieces of detection target data each for identifying a captured camera, the captured camera being captured in the piece of captured image data which has been captured by a capturing camera, and the captured camera and the capturing camera being included in the plurality of cameras; a calculating step of obtaining, for each of the detected pieces of detection target data, by performing calculation based on the piece of detection target data, a piece of relative information indicating coordinates and a capturing direction of a position-specified camera in a coordinate system of an origin camera, the origin camera being one of the capturing camera and the captured camera, and the position-specified camera being an other one of the capturing camera and the captured camera; a judging step of judging, for each piece of relative information, whether the piece of relative information is to be converted to a piece of information which uses a coordinate system of a reference camera among the plurality of cameras; a relative information conversion operating step of performing the conversion in accordance with a result of the judgement in the judging step; and a relative position information managing step of aggregating, (a) among the obtained pieces of relative information, each unconverted piece of relative information which uses the coordinate system of the reference camera, and (b) the converted pieces of relative information, thereby generating a piece of relative position information indicating coordinates and a capturing direction of each of the plurality of cameras in the coordinate system of the reference camera.

BRIEF DESCRIPTION OF THE DRAWINGS

FIG. 8 shows relative information;

FIG. 10 shows pieces of relative information registered in a queue;

FIG. 11 shows relative position information 60;

FIG. 17 shows how conversion operations are performed in a case where a reference camera is the captured camera;

FIG. 21 shows an example of a user interface;

FIG. 23 shows an example of a user interface;

DESCRIPTION OF REFERENCE NUMERALS

Figure 1:
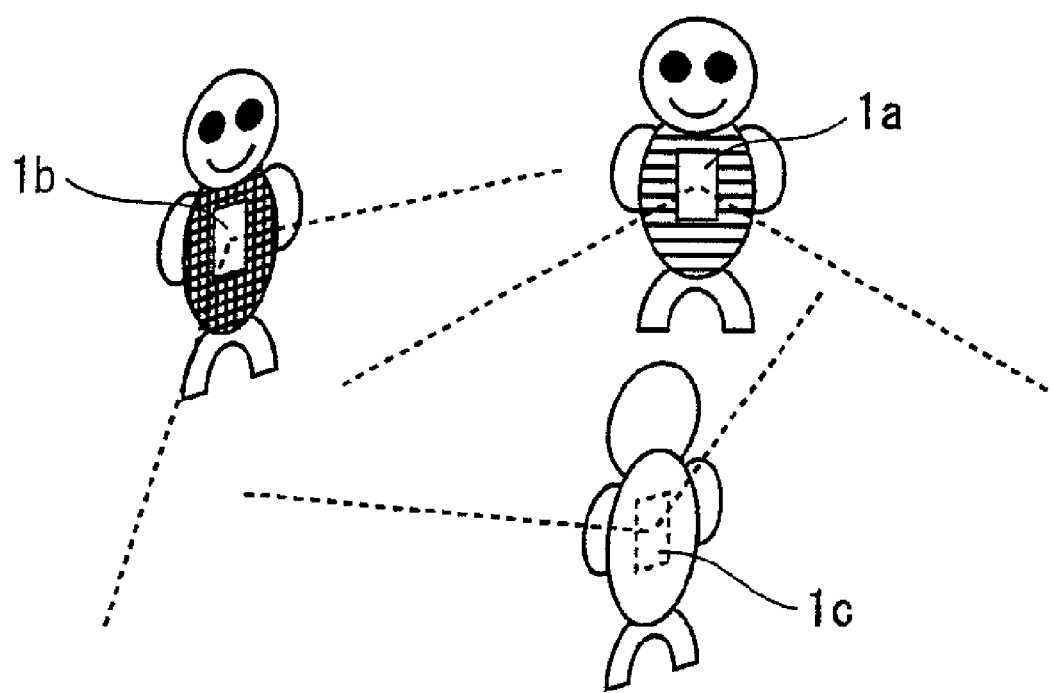
FIG. 1 shows an example of an image-capturing situation of cameras according to the present invention.

1 camera
2 data processing apparatus
3 display unit
6 relative information calculation unit
7 positional relationship calculation unit
8 image selection support unit
11 captured image acquisition unit
12 same-time captured images extraction unit
13 capturing camera identification unit
14 image recognition unit
15 captured camera identification unit
16 captured camera information calculation unit 17 captured camera direction calculation unit
18 captured camera coordinate calculation unit
19 relative information generation unit
51 relative information acquisition unit
52 reference camera setting unit
53 data management unit
54 data judgement unit
55 relative position information management unit
56 relative information conversion operation unit

BEST MODE FOR CARRYING OUT THE INVENTION

<First Embodiment>

In the following, an embodiment with respect to a data processing apparatus of the present invention and a data processing system using the data processing apparatus is described with reference to the drawings.

1. Overview

FIG. 1 shows an example of an image-capturing situation of cameras according to the present invention.

As shown in FIG. 1, according to the present invention, it is assumed that each person wears a camera ($1a$, $1b$, $1c$, ...) and captures images. Positional relationships among the cameras are calculated based on the images captured by the cameras. Here, the cameras correspond one-to-one with the people. Each person may move around, or may not move much. According to the present invention, relative positional relationships among the cameras, that is, positional relationships among the people, at each given time are calculated.

It should be noted that the present embodiment, upon calculating the positional relationships among the cameras, provides an image selection support system that supports selection with respect to the images captured by the cameras, using the calculated positional relationships. Alternatively, simply displaying the calculated positional relationships as an image is useful, as positional relationships among cameras can be utilized for various purposes.

Specific explanation is given below.

2. Structure

Figure 2:
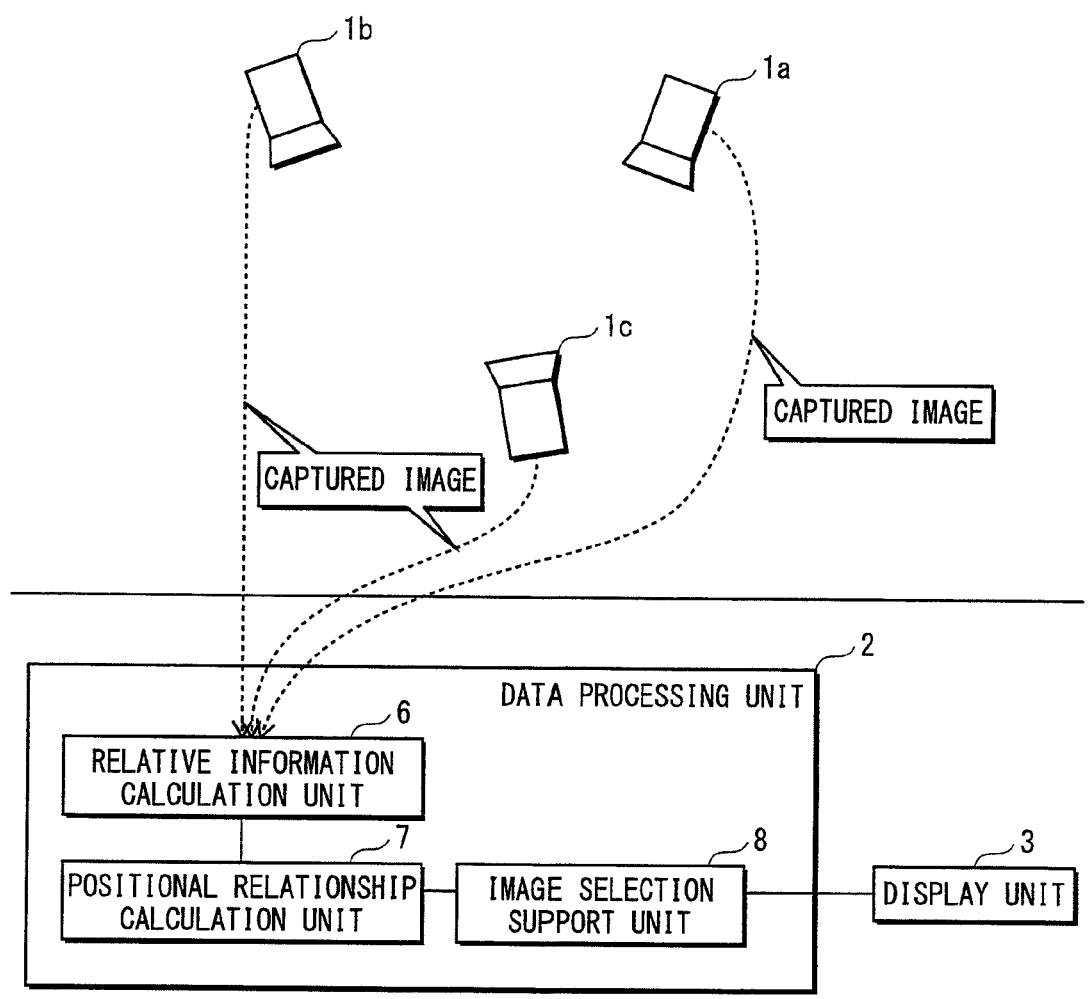
FIG. 2 is a functional block diagram showing an overview of a data processing system of the present invention.

FIG. 2 is a functional block diagram showing an overview of the data processing system of the present invention.

As shown in FIG. 2, the data processing system includes a plurality of cameras ($1a$, $1b$, $1c$, ...), a data processing apparatus 2, and a display unit 3.

2.1 Camera

In the present embodiment, each of the plurality of cameras ($1a$, $1b$, $1c$, ...) captures a still image at a predetermined interval. It should be noted that each of the still images captured by the cameras is attached with information such as information for identifying the camera which captured the still image, time of the image capturing, and the like, as metadata.

2.2 Data Processing Apparatus 2

The data processing apparatus 2 manages positional relationships among the plurality of cameras using a positional relationship calculation unit 7 (described later). Specifically, the data processing apparatus 2 receives images captured by the cameras from the cameras, and calculates positional relationships among the cameras at a given time based on the received captured images. It should be noted that the positional relationship refers to, relative to one camera, coordinates and directions of other cameras.

Although various processing can be conducted using the calculated positional relationships, in the present embodiment, the data processing apparatus 2 generates, with use of an image selection support unit 8 (described later), a user interface which supports a user to select images captured by the cameras. The detailed structure of the data processing apparatus 2 is described in "2.4 Details of Data Processing Apparatus 2" later.

2.3 Display Unit 3

The display unit 3 receives an image signal output from the data processing apparatus 2 and displays an image based on the received image signal. The display unit 3 is realized as, for example, an LCD (Liquid Crystal Display), a PDP (Plasma Display Panel), or an organic EL (Organic Electro-Luminescence).

2.4 Details of Data Processing Apparatus 2

Here, the data processing apparatus 2 is described in detail.

As shown in FIG. 2, the data processing apparatus 2 includes a relative information calculation unit 6, the positional relationship calculation unit 7, and the image selection support unit 8.

The relative information calculation unit 6 acquires captured images generated by the plurality of cameras, analyzes each of the captured images, and calculates, with respect to each of the captured images, a relative positional relationship between a capturing camera which has captured the image and a captured camera whose image has been captured in the captured image. Specific details are described later using FIG. 3.

The positional relationship calculation unit 7, calculates relative positional relationships of cameras relative to one of the cameras as reference, based on the calculation results of the relative information calculation unit 6 for the captured images. Specific details are described later using FIG. 9.

The image selection support unit 8 generates a user interface based on the calculation results of the positional relationship calculation unit 7 and outputs, to the display unit 3, an image signal for causing the display unit 3 to display the user interface.

2.5 Details of Relative Information Calculation Unit 6

Details of the relative information calculation unit 6 are given in the following.

Figure 3:
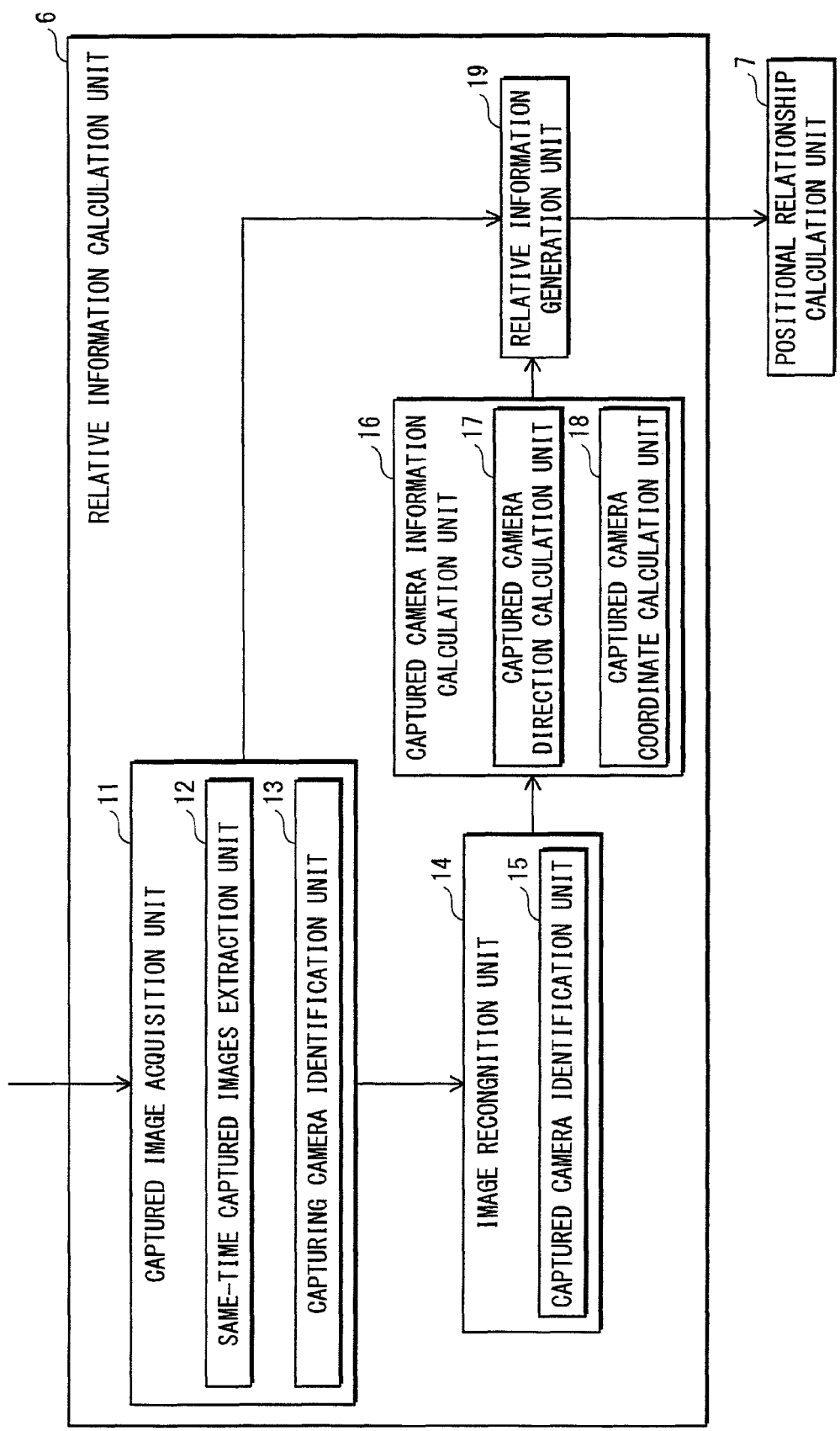
FIG. 3 is a functional block diagram showing details of a relative information calculation unit 6.

FIG. 3 is a functional block diagram showing details of the relative information calculation unit 6.

The relative information calculation unit 6 includes a captured image acquisition unit 11, a same-time captured images extraction unit 12, a capturing camera identification unit 13, an image recognition unit 14, a captured camera identification unit 15, a captured camera information calculation unit 16, a captured camera direction calculation unit 17, a captured camera coordinate calculation unit 18, and a relative information generation unit 19.

2.5.1 Captured Image Acquisition Unit 11

The captured image acquisition unit 11 acquires images captured by the cameras. The captured image acquisition unit 11 is, for example, connected to the cameras or connected to a recording medium having recorded the images captured by the cameras and reads the captured images from the recording medium, thereby acquiring the images captured by the cameras.

2.5.2 Same-Time Captured Images Extraction Unit 12

The same-time captured images extraction unit 12 refers to a capturing time attached as metadata to each captured image and extracts, from the captured images acquired from the cameras, captured images based on a predetermined time.

2.5.3 Capturing Camera Identification Unit 13

The capturing camera identification unit 13 refers to the metadata attached to each captured image, and acquires identification information of the capturing camera which captured the image.

2.5.4 Image Recognition Unit 14

The image recognition unit 14 conducts image recognition on each captured image and detects an area for identifying a captured camera that is captured in the captured image. Specifically, in the present embodiment, such detection is performed by means of two-dimensional markers. Details are described later with reference to FIG. 4 and the like.

2.5.5 Captured Camera Identification Unit 15

The captured camera identification unit 15 acquires identification information of a captured camera based on the area detected by image recognition. Details are described later with reference to FIG. 4 and the like.

2.5.6 Captured Camera Information Calculation Unit 16

The captured camera information calculation unit 16 calculates a relative positional relationship between a capturing camera and a captured camera, for each captured image. In the present embodiment, a positional relationship between the capturing camera and the captured camera is calculated based on a camera coordinate system of the capturing camera.

Specifically, the captured camera information calculation unit 16 includes a captured camera direction calculation unit 17 and a captured camera coordinate calculation unit 18.

The captured camera direction calculation unit 17 calculates the direction of the captured camera based on the camera coordinate system of the capturing camera. Here, the direction of the captured camera refers to a direction in which the captured camera performs image-capturing.

Also, the captured camera coordinate calculation unit 18 calculates coordinates of the captured camera based on the camera coordinate system of the capturing camera.

2.5.6.1 Overview of Detailed Description of Captured Camera Identification Unit 15 and the Like Here, detailed description is provided on the captured camera identification unit 15 and the captured camera information calculation unit 16. Specifically, the description is provided on the following method:

after image recognition is performed on the captured image, (i) the captured camera identification unit 15 identifies the captured camera, and (ii) the captured camera information calculation unit 16 calculates, based on a camera coordinate system of one of the captured camera and the capturing camera, relative coordinates and a direction of the other camera.

In the present embodiment, specifically, a two-dimensional marker is provided at a predetermined position of each camera, and the image recognition unit 14 detects the two-dimensional marker captured in the image which was captured by the capturing camera.

This way, the captured camera identification unit 15 and the captured camera information calculation unit 16 (i) identify the captured camera and (ii) calculate the relative coordinates and the direction. It should be noted that various techniques have been developed and practically used to detect a two-dimensional marker captured in an image to (i) identify the two-dimensional marker and (ii) calculate a relative positional relationship between the camera and the two-dimensional marker in a case where parameters (size, shape, etc.) of the marker and parameters (focal distance, image capture resolution, etc.) of the camera are known. The following non-patent document is an example of a known such technique: Kato, H., Billinghurst, M. (1999) Marker Tracking and HMD Calibration for a video-based Augmented Reality Conferencing System, In Proceedings of the 2nd International Workshop on Augmented Reality (IWAR 99). October, San Francisco, USA. Accordingly, in the following, a specific application method in the present embodiment is briefly described, and detailed descriptions are omitted.

2.5.6.2 Details of Captured Camera Identification Unit 15

First, description is given on (i) how the captured camera identification unit 15 identifies the captured camera.

Figure 4:
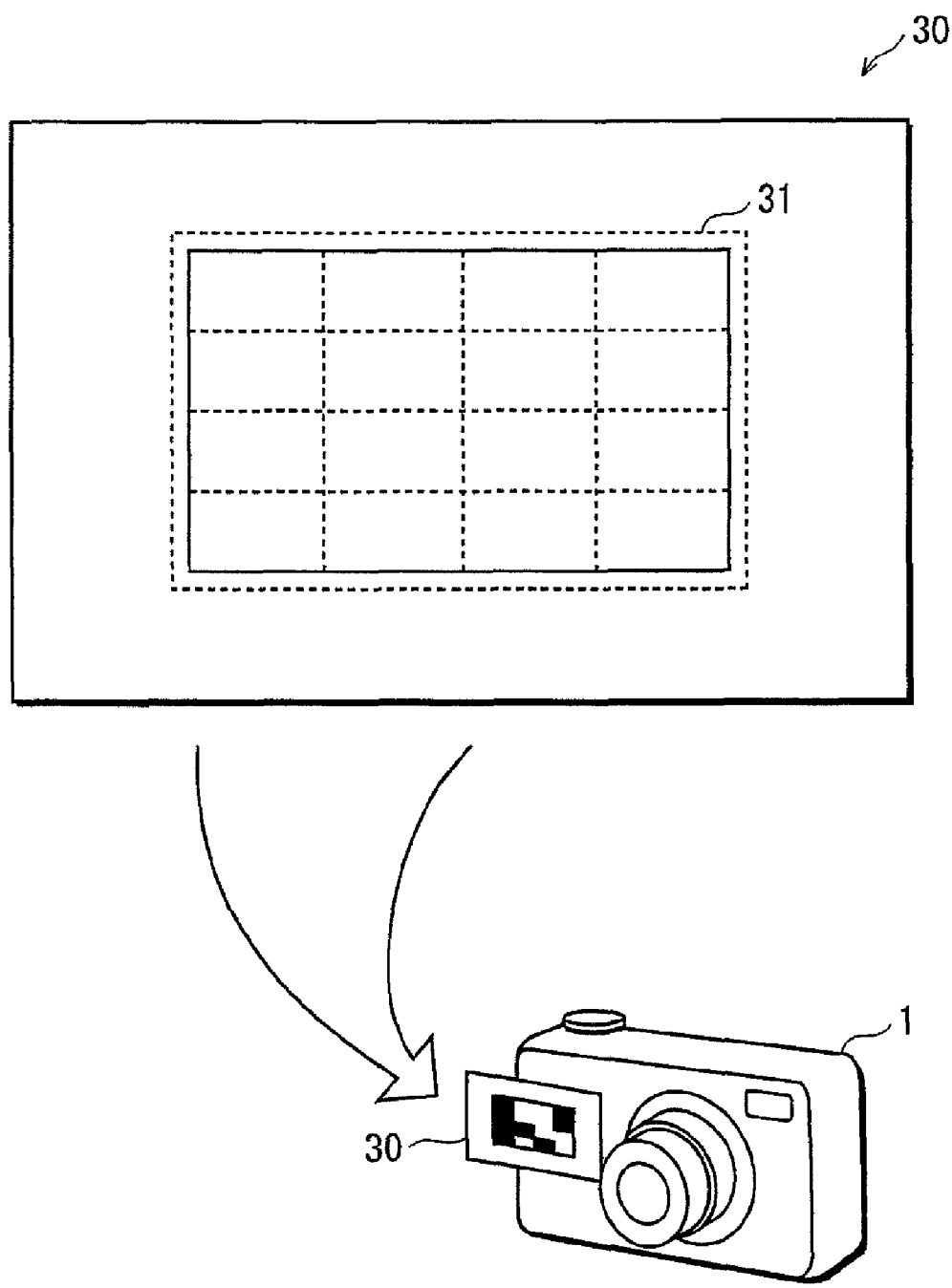
FIG. 4 shows a two-dimensional marker 30.

FIG. 4 shows a two-dimensional marker 30.

As shown in the figure, the two-dimensional marker 30 has a rectangular shape having four vertices and is provided at a predetermined position of each camera. Note that it is assumed that parameters (size, shape, etc.) of the two-dimensional markers 30 and parameters (focal distance, image capture resolution, etc.) of each camera are known. In the present embodiment, as shown in the figure, the two-dimensional marker 30 is arranged at predetermined coordinates in the camera coordinate system with the camera as reference. That is to say, coordinates of the two-dimensional marker 30 in the camera coordinate system are known. It should be noted that in the camera coordinate system (Xc, Yc, Zc), the focal point of the camera is the origin, the direction perpendicular to the image plane (i.e., the capturing direction of the camera) is the Z-axis. The directions respectively parallel to the x-axis and y-axis are the X-axis and Y-axis, respectively.

As shown in the figure, the two-dimensional marker 30 has a camera identification area 31. The camera identification area 31 is an area for identifying the camera on which the two-dimensional marker 30 is provided.

In order to identify each camera, in the present embodiment, two-dimensional codes (2D codes) are used. Specifically, as shown in FIG. 4, the camera identification area 31 is divided into four rows×four columns of small areas, and the small areas are two-color-coded. For example, each small area is coded as white or black. How the small areas are two-color-coded using white and black is unique to each camera.

Figure 5:
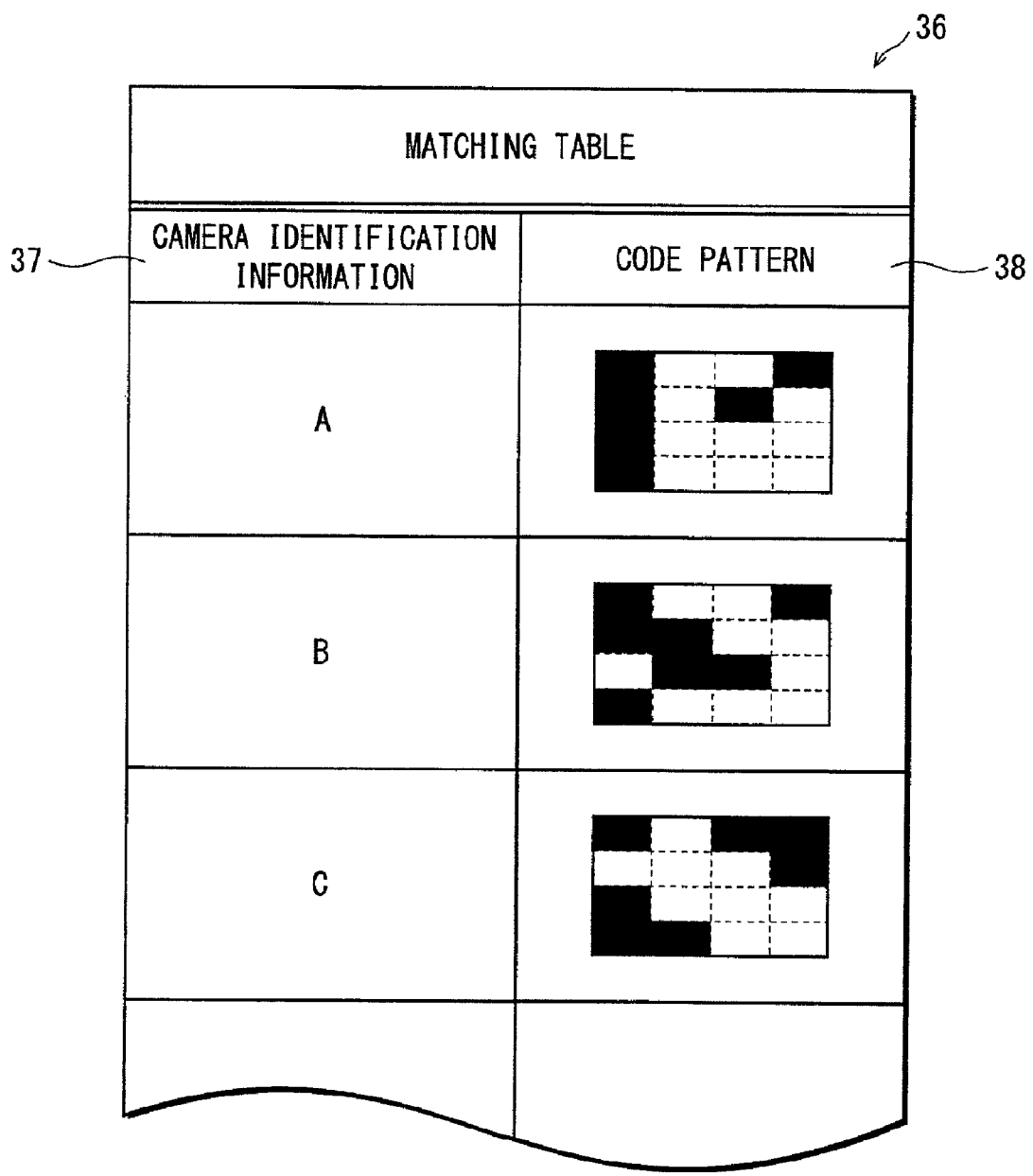
FIG. 5 shows a matching table 36.

It should be noted that as shown in FIG. 5, how the small areas of the respective cameras are coded (code patterns) are held as a matching table 36 by the image recognition unit 14. One record of the matching table 36 is composed of camera identification information 37 and a code pattern 38, as shown in FIG. 5. That is to say, in the matching table 36, each camera identification information for identifying a camera corresponds with information indicating a pattern of a two-dimensional code that is unique to the camera.

Figure 6:
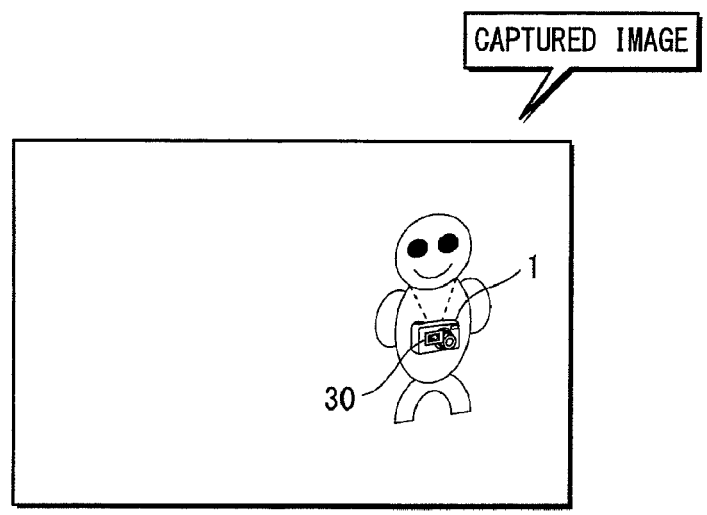
FIG. 6 shows the two-dimensional marker 30 captured in a captured image.

As described above, in the present embodiment, a two-dimensional marker 30 having a code pattern unique to each camera is provided at the predetermined position of the camera. As shown in FIG. 6, when the two-dimensional marker 30 is captured in an captured image, the image recognition unit 14 detects an contour of the two-dimensional marker 30 by performing image recognition on the captured image. After that, the captured camera identification unit 15 performs pattern matching by comparing the code pattern of the camera identification area 31 of the detected two-dimensional marker 30 and the code patterns of the matching table 36, thereby identifying the captured camera provided with this two-dimensional marker 30.

2.5.6.3 Details of Captured Camera Information Calculation Unit 16

Next, how (ii) the captured camera information calculation unit 16 calculates the relative coordinates and the directions of the capturing camera and the captured camera. In the present embodiment, the technique described by the above-described non-patent document is used.

The direction and the coordinates of the two-dimensional marker 30 captured in the captured image relative to the capturing camera is calculated by the computation according to the technique described by the above-mentioned non-patent document. Here, the direction of the two-dimensional marker 30 is assumed to be substantially the same as the direction in which the captured camera performs image-capturing. That is to say, the direction of the two-dimensional marker 30 can be approximated to the direction of the captured camera. Also, because the relative positional relationship between the captured camera and the two-dimensional marker 30 arranged on the captured camera is known, the coordinates of the two-dimensional marker 30 relative to the capturing camera is revised to calculate the coordinates of the captured camera.

This way, the captured camera information calculation unit 16 calculates the direction and the coordinates of the captured camera relative to the capturing camera. The calculated direction and coordinates of the captured camera are expressed as shown in FIG. 7.

Figure 7:
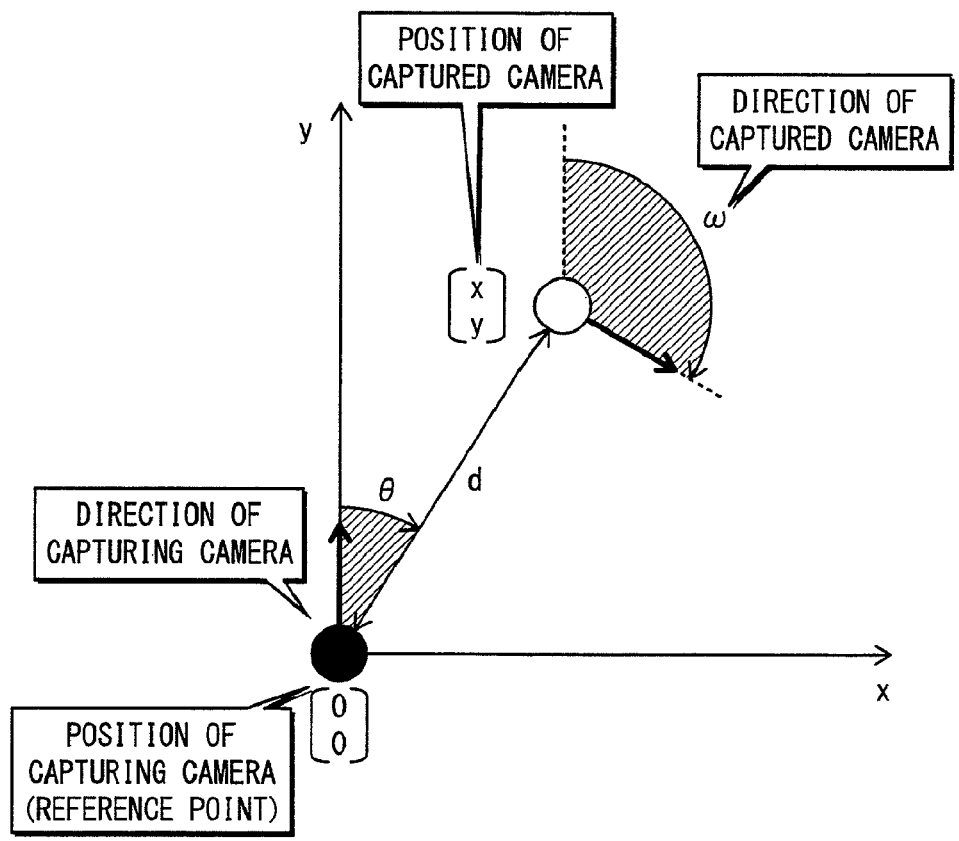
FIG. 7 shows a relative positional relationship between a capturing camera and a captured camera.

FIG. 7 shows the relative positional relationship between the capturing camera and the captured camera. It should be noted that in the present embodiment, assuming that the coordinates of the captured camera in the camera coordinate system with reference to the capturing camera are expressed by (X, Y, Z), it is assumed that the value "Y" on the Y-axis is smaller than the value "X" on the X-axis and the value "Z" on the Z-axis. Accordingly, the relative positions of the capturing camera and the captured camera are expressed as two-dimensional coordinates (x, y) with "x" denoting the value "X" on the X-axis, and "z" denoting the value "Z" on the Z-axis. Also, the direction of the captured camera is expressed by an angle from the Z-axis (i.e., the y-axis shown in FIG. 7) of the camera coordinate system with reference to the capturing camera, with the clockwise direction being positive.

2.5.7 Relative Information Generation Unit 19

The description of the relative information calculation unit 6 resumes.

The relative information generation unit 19 generates a piece of relative information for each captured image, and outputs the generated piece of relative information to the positional relationship calculation unit 7.

2.5.7.1 Relative Information

Here, description is given on relative information. FIG. 8 shows pieces of relative information (80a, 80b, . . . ). As shown in FIG. 8, a piece of relative information includes, in correspondence with one another, a capture time 81, capturing camera identification information 82, captured camera identification information 83, a captured camera direction 84, and captured camera coordinates 85.

2.5.7.2 Details of Relative Information

In a piece of relative information, the capture time 81 indicates the time at which the image was captured, and corresponds with the time pertaining to the extraction performed by the same-time captured images extraction unit 12. The capturing camera identification information 82 indicates the capturing camera and corresponds with the identification information acquired by the capturing camera identification unit 13.

The captured camera identification information 83 indicates the captured camera and corresponds with the identification information acquired by the captured camera identification unit 15.

The captured camera direction 84 indicates the relative direction of the captured camera and corresponds with the result of the calculation performed by the captured camera direction calculation unit 17.

The captured camera coordinates 85 indicate the relative coordinates of the captured camera and correspond with the result of the calculation performed by the captured camera coordinate calculation unit 18.

Described above is the relative information calculation unit 6.

2.6 Positional Relationship Calculation Unit 7

The following describes details of the positional relationship calculation unit 7.

Figure 9:
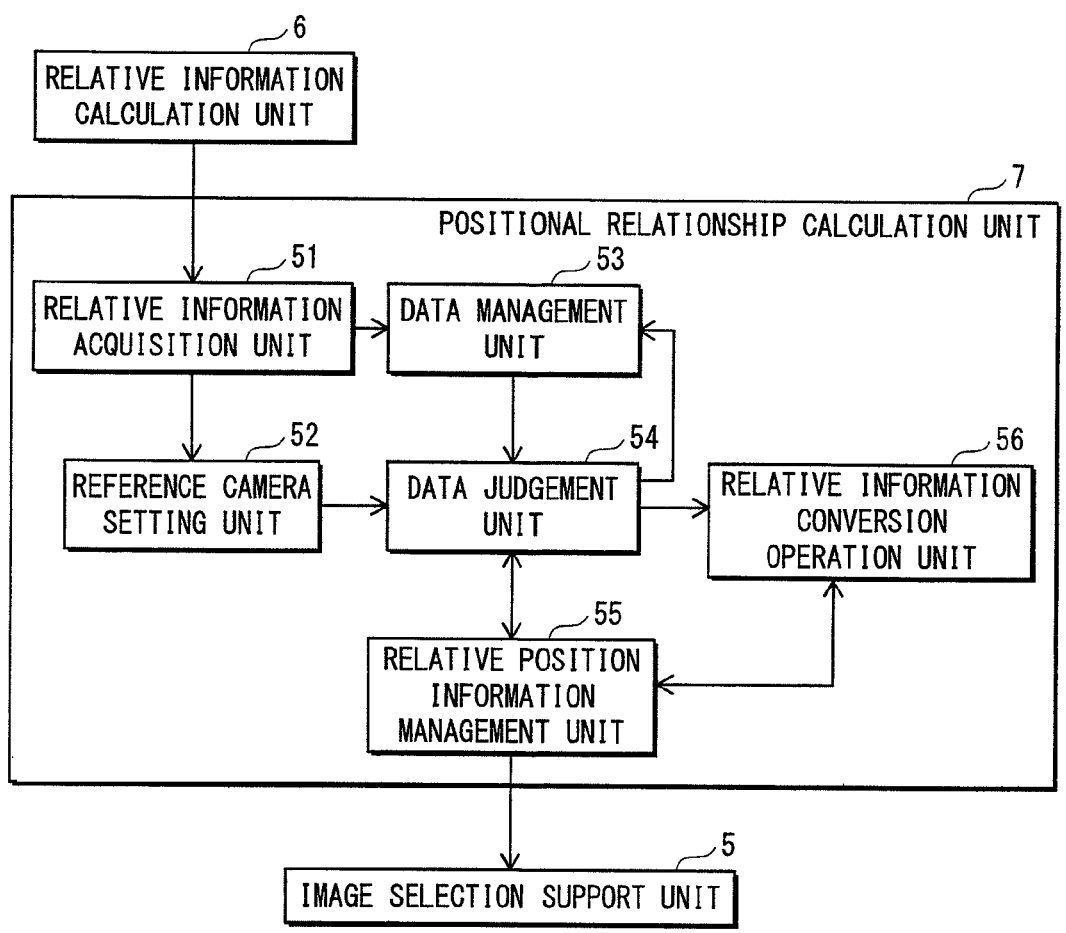
FIG. 9 is a functional block diagram showing details of a positional relationship calculation unit 7.

FIG. 9 is a functional block diagram showing details of the positional relationship calculation unit 7.

The positional relationship calculation unit 7 generates relative position information 60 indicating, relative to one camera, relative directions and coordinates of other cameras. As shown in FIG. 9, the positional relationship calculation unit 7 includes a relative information acquisition unit 51, a reference camera setting unit 52, a data management unit 53, a data judgement unit 54, a relative positional information management unit 55, and a relative information conversion operation unit 56.

2.6.1 Relative Information Acquisition Unit 51

The relative information acquisition unit 51 sequentially acquires pieces of relative information output from the relative information calculation unit 6, and outputs the acquired pieces of relative information to the data management unit 53.

2.6.2 Reference Camera Setting Unit 52

The reference camera setting unit 52 sets a camera as reference (reference camera) for calculating directions and coordinates of cameras relative to one camera. To set the reference camera, various methods can be available. For example, the capturing camera indicated by the capturing camera identification information 82 of the first piece of relative information among pieces of relative information registered in a queue by the data management unit 53 (described later) can be set as the reference camera.

2.6.3 Data Management Unit 53

The data management unit 53 manages pieces of relative information at each predetermined set time.

Specifically, the data management unit 53 receives each piece of relative information output from the relative information acquisition unit 51 and manages the relative information, for example, by registering the relative information in a queue, as shown in FIG. 10. Details are described in "3.3 Operations of Positional Relationship Calculation Unit 7".

Here, description is provided on FIG. 10 showing pieces of relative information registered in a queue.

As described earlier, pieces of relative information are registered in a queue, and are output from the queue in the order of number indicated by a number 86. It should be noted that capturing camera identification information 82 and the like included in each piece of relative information registered in the queue are the same as those described using FIG. 8, and accordingly, description is omitted. Note that FIG. 10 omits the capture time 81 of each piece of relative information.

2.6.4 Data Judgement Unit 54

The data judgement unit 54 performs part of processing for generating the relative position information 60. Specifically, the data judgement unit 54 acquires each piece of relative information and judges, for each piece of relative information, (i) whether the piece of relative information can be used for generating the relative position information 60, and (ii) whether the piece of relative information requires a conversion operation (needs to be converted or not) by a relative information conversion operation unit 56 (described later in "2.6.6 Relative Information Conversion Operation Unit 56"). It should be noted that the conversion operation converts the received piece of relative information to information indicating a position of another camera relative to the reference camera. The data judgement unit 54 controls an output destination of the piece of relative information, discards the piece of relative information, and the like. Details are described later using FIG. 15.

2.6.5 Relative Position Information Management Unit 55

The relative position information management unit 55 manages the relative position information 60.

Here, detailed description is given on the relative position information 60.

FIG. 11 shows the relative position information 60.

Each record in the relative position information 60 includes a time 61, a reference camera 62, a target camera 63, a relative position 64, and a relative direction 65.

The time 61 indicates the time at which the relationships among the cameras existed.

The reference camera 62 indicates a camera which provides a basis for calculating relative positional relationships among the cameras. The reference camera 62 is set by the reference camera setting unit 52.

The target camera 63 is a camera for which a relative positional relationship relative to the reference camera is to be calculated.

The relative direction 65 indicates a direction of the target camera relative to the reference camera 62. The direction of the target camera is, in this example, expressed by an angle from the Z-axis (image capturing direction) of the camera coordinate system with reference to the capturing camera, with the clockwise direction being positive.

The relative position 64 indicates the position (coordinates) of the target camera relative to the reference camera 62. The position of the target camera is, for example, expressed as coordinates in the xy-plane of the camera coordinate system of the reference camera whose X-axis is the x-axis and whose Y-axis is the y-axis of the xy-plane.

After undergoing the conversion operation performed by the relative information conversion operation unit 56 or the like, each piece of relative information at the predetermined set time indicates a relative direction and coordinates of a camera relative to another camera, as shown in the relative position information 60 of FIG. 11. It should be noted that in FIG. 11, a camera "A" is the reference camera.

2.6.6 Relative Information Conversion Operation Unit 56

Now, the description of the positional relationship calculation unit 7 resumes.

The relative information conversion operation unit 56 receives each piece of relative information from the data judgement unit 54 and converts the positional relationship between the capturing camera and the captured camera indicated by the piece of relative information into a positional relationship based on the coordinate system of the reference camera. Details are described later using FIGS. 16-18.

3. Operations

Next, operations of the data processing apparatus 2 are described.

3.1 Overall Operations of Data Processing Apparatus 2

Figure 12:
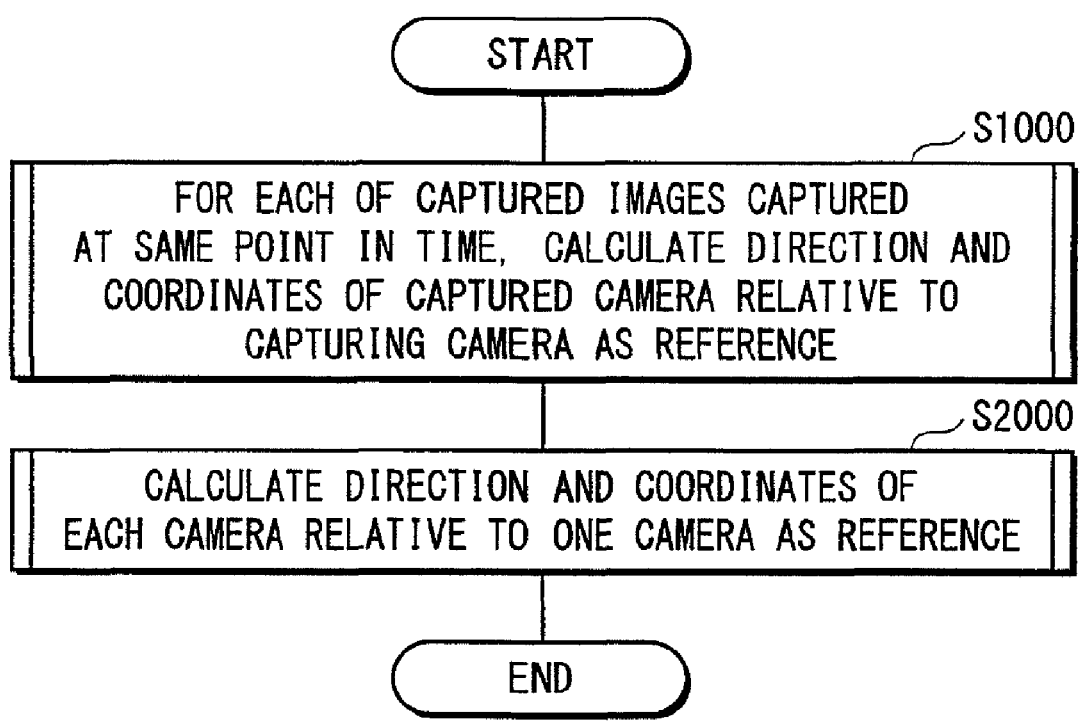
FIG. 12 is a flowchart showing overall operations of a data processing apparatus 2.

FIG. 12 is a flowchart showing overall operations of the data processing apparatus 2.

As shown in FIG. 12, the relative information calculation unit 6 of the data processing apparatus 2 calculates, for each piece of the images captured at the same point in time, a direction and coordinates of the captured camera relative to the capturing camera (S1000). The relative information calculation unit 6 generates apiece of relative information for each of the captured images, and outputs the generated pieces of relative information to the positional relationship calculation unit 7.

The positional relationship calculation unit 7, upon receiving a plurality of pieces of relative information, calculates a direction and coordinates, relative to one of the cameras, of other cameras, thereby generating relative position information 60 (S2000).

3.2 Operations of Relative Information Calculation Unit 6

Here, the operations in the step S1000 by the relative information calculation unit 6 are described in detail.

Figure 13:
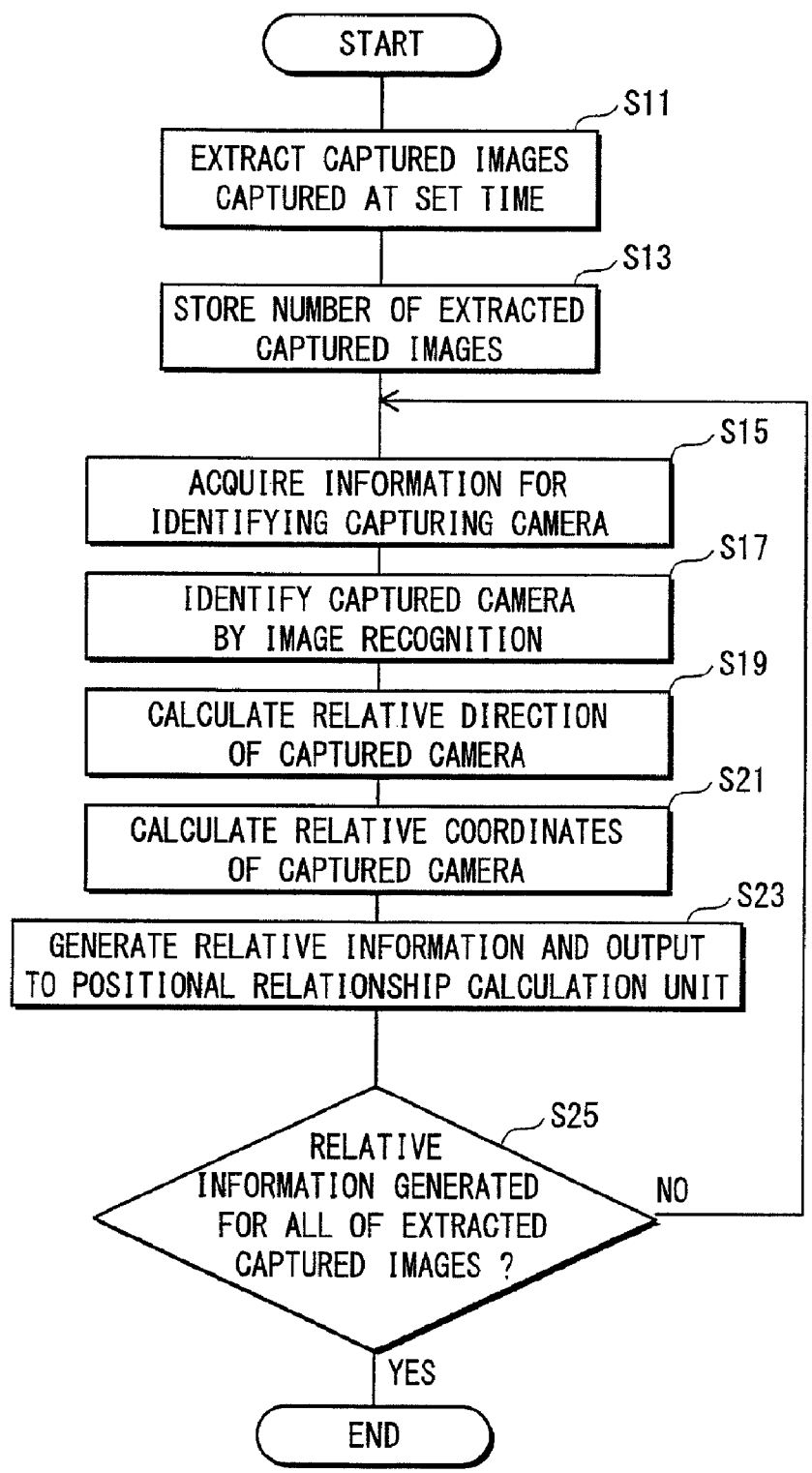
FIG. 13 is a flowchart showing details of operations of the relative information calculation unit 6.

FIG. 13 is a flowchart showing details of operations of the relative information calculation unit 6.

The relative information calculation unit 6 acquires, using the captured images acquisition unit 11, images captured by the cameras.

The same-time captured images extraction unit 12 extracts, out of the acquired captured images, images that have been captured during a predetermined time including a prescribed set time (S11). For example, The same-time captured images extraction unit 12 extracts images captured during several seconds which include the set time. The relative information calculation unit 6 stores the number of captured images extracted in the step S11 (S13). Specifically, for example, the number of the captured images extracted in the step S11 is stored into a variable "n".

n=number of extracted captured images

Also, a variable "i" is initialized to a value "0".

i=0

Here, the variable "n" indicates the total number of the extracted captured images. The variable "i" indicates how many times processing for generating a piece of relative information has been performed. For each of the captured images extracted in the step S11, for example, an identifier indicating a captured image is stored in a queue, and each of the captured images is sequentially targeted for processing, generating pieces of relative information as a result.

The capturing camera identification unit 13 (a) reads from the queue an identifier that indicates a captured image targeted for processing, (b) refers to metadata of the captured image indicated by the identifier, and (c) extracts identification information of the capturing camera of the captured image and stores therein the extracted identification information (S15).

The image recognition unit 14 performs image recognition on the captured image processed by the capturing camera identification unit 13 in the step S15, attempting to detect a two-dimensional marker. If a two-dimensional marker is detected, the captured camera identification unit 15 acquires identification information of a captured camera captured in the captured image and stores the acquired identification information (S17). If no two-dimensional marker 30 is detected in the step S17, the relative information calculation unit 6 adds 1 to the variable "i" (i=i+1), performs the processing of the step S15, reads a new identifier from the queue, and performs the subsequent processing.

If a two-dimensional marker is detected by the image recognition unit 14 in the step S17, the captured camera direction calculation unit 17 calculates a relative direction of the captured camera in the camera coordinate system with reference to the capturing camera (S19). The captured camera coordinate calculation unit 18 calculates relative coordinates of the captured camera in the camera coordinate system of the capturing camera (S21).

the relative information generation unit 19 associates the information pieces acquired in the steps S15, S17, S19, and S21 and the set time pertaining to the extraction in the step S11 with one another, thereby generating a piece of relative information for one captured image. The relative information generation unit 19 outputs the generated piece of relative information to the positional relationship calculation unit 7 (S23), and adds 1 to the variable "i".

$$i=i+1$$

It is judged whether a piece of relative information is generated for each of the captured images extracted in the step S11 (S25). Specifically, it is judged whether or not the variable "i" is equal to the variable "n" or more. If it is judged that a piece of relative information has not been generated for each of the captured images in the step S25 (i.e., if there is a captured image for which no piece of relative information is generated) (S25: NO) (i<n), the processing of the step S15 onward is performed for the next captured image stored in the queue, generating a piece of relative information.

If it is judged that a piece of relative information has been generated for each of the captured images in the step S25 (S25: YES), the relative information calculation unit 6 terminates operations.

3.3 Operations of Positional Relationship Calculation Unit 7

Next, the operations in the step S2000 by the positional relationship calculation unit 7 are described in detail.

Figure 14:
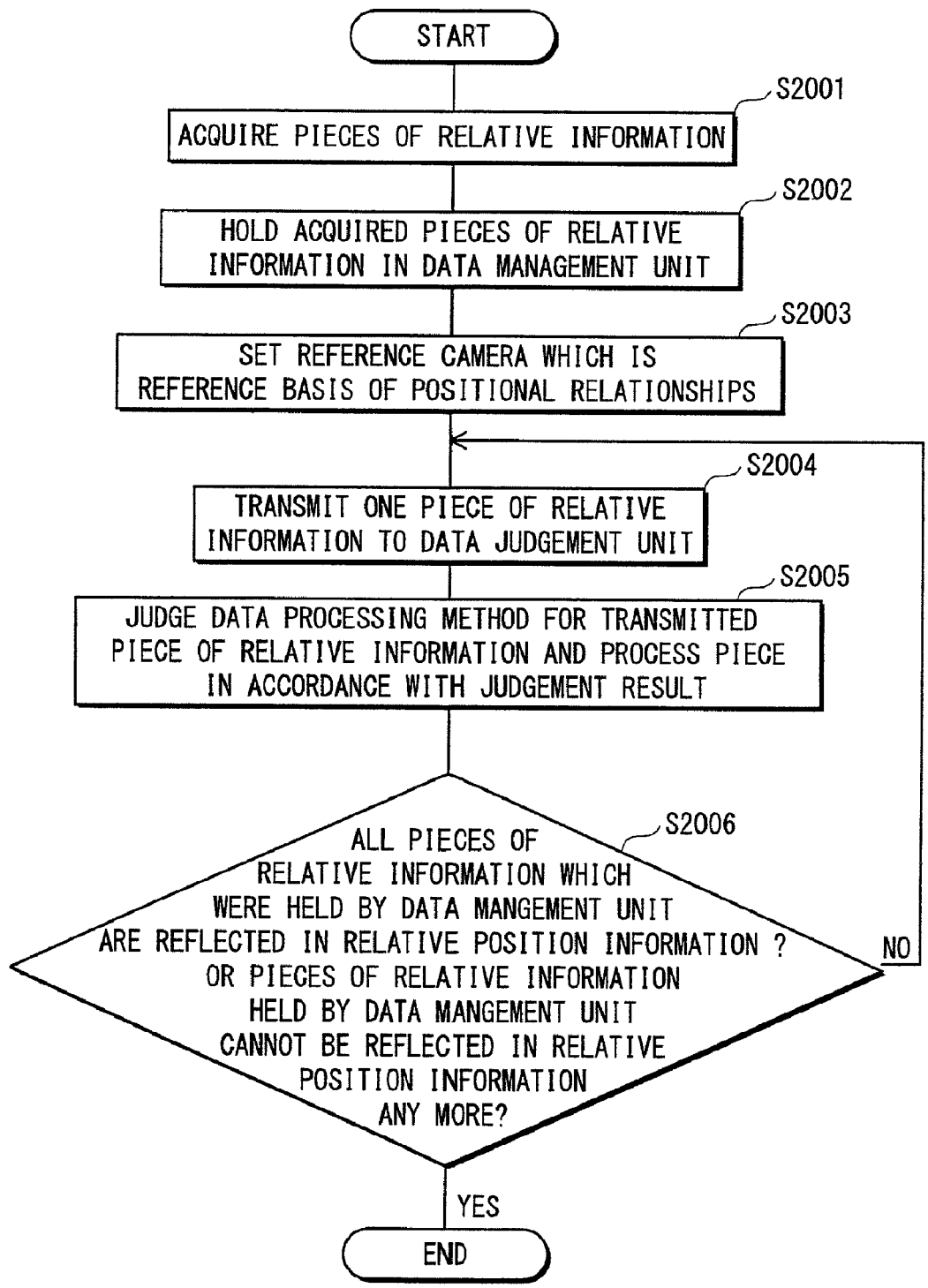
FIG. 14 is a flowchart showing details of operations of the positional relationship calculation unit 7.

FIG. 14 is a flowchart showing details of operations of the positional relationship calculation unit 7.

The positional relationship calculation unit 7 acquires pieces of relative information pertaining to the same point in time, using the relative information acquisition unit 51 (S2001).

Next, the positional relationship calculation unit 7 holds the pieces of relative information pertaining to the same point in time acquired by the relative information acquisition unit 51, for example, in a queue shown in FIG. 10 (S2002).

Next, the positional relationship calculation unit 7 sets the reference camera, which is the basis of positional relationships, using the reference camera setting unit 52 (S2003).

After that, the positional relationship calculation unit 7 sequentially transmits the held pieces of relative information to the data judgement unit 54, using the data management unit 53 (S2004).

Next, the positional relationship calculation unit 7 judges on a subsequent processing method with respect to each piece of relative information received by the data management unit 53 from the data judgement unit 54. The data judgement unit 54 performs the following in accordance with a judgement result (details are described later with reference to FIG. 15):

(i) transmitting the piece of relative information to the relative position information management unit 55;

(ii) discarding the piece of relative information;

(iii) transmitting the piece of relative information to the relative information conversion operation unit 56; or (iv) returning the piece of relative information to the data management unit 53.

In the case of (i) above, the positional relationship calculation unit 7 holds, in the relative position information shown in FIG. 11, the piece of relative information transmitted from the data judgement unit 54 to the relative position information management unit 55. In the case of (iii), the positional relationship calculation unit 7 converts the piece of relative information transmitted from the data judgement unit 54 to the relative position information management unit 55, using the relative information conversion operation unit 56. This conversion is described later in detail with reference to FIGS. 16-18. The positional relationship calculation unit 7 transmits the converted piece of relative information from the relative information conversion operation unit 56 to the relative position information management unit 55 and holds the transmitted converted piece of relative information in the relative position information 60.

In the case of (iv), the positional relationship calculation unit 7 registers the piece of relative information returned from the data judgement unit 54 to the data management unit 53, for example, at the end of the queue, using the data management 53 (S2005).

The positional relationship calculation unit 7 terminates processing when one of the following (a) and (b) is satisfied:

(a) if all pieces of the relative information held by the data management unit 53 are reflected in the relative position information 60;

(b) if no piece of relative information held by the data management unit 53 can be reflected in the relative position information 60.

It should be noted that (a) above means that there is no more piece of relative information held in a queue or the like by the data management unit 53. Meanwhile, (b) above means that the data management unit 53 holds no piece of relative information whose capturing camera identification information 82 or captured camera identification information 83 matches any of the reference camera and the target cameras included in the relative position information 60 held by the relative position information management unit 55.

3.4 Details of Operations of Data Judgement Unit 54

Here, the judgement processing by the data judgement unit 54 in the step S2005 is described in detail.

First, its overview is described.

The relative position information 60 managed by the relative position information management unit 55 indicates positional relationships between the reference camera and each of the target cameras.

Accordingly, if the capturing camera or the captured camera of a piece of relative information is the reference camera, or if the reference camera is included among the target cameras included the records of the relative position information 60, a record can be added to the relative position information 60 using the piece of relative information.

Figure 15:
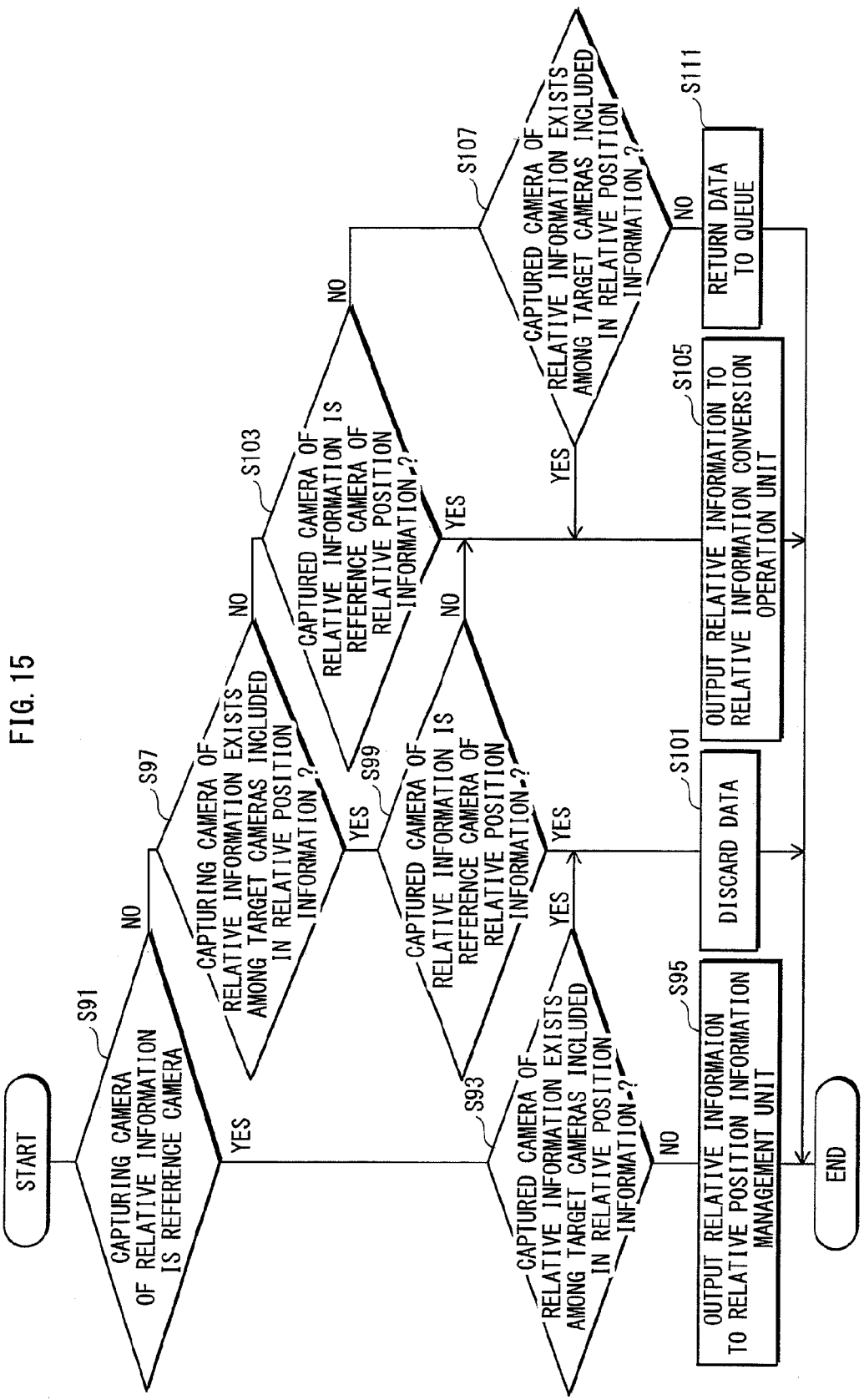
FIG. 15 shows details of judgement processing by a data judgement unit 54.

FIG. 15 shows details of the judgement processing by a data judgement unit 54.

In the following example, the data judgement unit 54 first judges:

(i) whether the capturing camera of the piece of relative information is the reference camera (S91), and (ii) whether the capturing camera of the piece of relative information is included in the relative position information 60 as one of the target cameras (S97).

After that, the data judgement unit 54 judges:

(iii) whether the captured camera of the piece of relative information is the reference camera (S103), and (iv) whether the captured camera of the piece of relative information is included in the relative position information 60 as one of the target cameras (S107).

In the steps above, if it is judged that neither the capturing camera nor the captured camera of the piece of relative information is included in the relative position information 60 as the reference camera or as one of the target cameras, no record can be added to the relative position information 60. Thus, the piece of relative information is returned to the data management unit 53 (S111).

The above is the description of the overview. Now specific explanation is given using FIG. 15.

(i) Upon receiving a piece of relative information output from the data management unit 53 in the step S2004, the data judgement unit 54 refers to the capturing camera identification information 83 of the piece of relative information and judges whether the camera indicated by the capturing camera identification information 83 (capturing camera) is the reference camera set by the reference camera setting unit 52 (S91).

In the step S91, if the capturing camera is the reference camera (S91:YES), the data judgement unit 54 refers to the camera indicated by the captured camera identification information 83 of the piece of relative information (captured camera) and the target camera 63 of each record of the relative position information 60 held by the relative position information management unit 55, and judges whether the captured camera already exists in the relative position information 60 as one of the target cameras (S93).

The following describes the case where, in the step S93, the captured camera of the piece of relative information does not exist in the records of the relative position information as one of the target camera (S93:NO). In this case, the positional relationship, indicated by the piece of relative information, between the capturing camera and the captured camera (direction and coordinates of the captured camera) has not been reflected in the relative position information 60. Accordingly, the data judgement unit 54 outputs, to the relative position information management unit 55, information that indicates the camera identified by the capturing camera identification information 82 of the piece of relative information as the reference camera 62 and indicates the camera indicated by the captured camera 83 of the piece of relative information as the target camera 63 (S95). The relative position information management unit 55 receives this information output from the data judgement unit 54 and adds the received information to the relative position information 60.

The following describes the case where, in the step S93, the captured camera of the piece of relative information exists in the relative position information as one of the target cameras in the records therein (S93:YES). In this case, the positional relationship, indicated by the piece of relative information, between the capturing camera and the captured camera has already been registered in the relative position information 60. Accordingly, the data judgement unit 54 discards the piece of relative information (S101).

(ii) The following describes the case where the capturing camera of the piece of relative information is not the reference camera in the step S91 (S91: NO).

In this case, the data judgement unit 54 refers to each target camera 63 of the records of the relative position information 60 and judges whether the capturing camera of the piece of relative information already exists as one of the target cameras of the relative position information 60 (S97).

Description is given on a case where the judgement is positive in the step S97, namely, the capturing camera of the piece of relative information exists among the target cameras of the records of the relative position information 60 (S97: YES). In this case, because the positional relationship between the reference camera and the capturing camera, and the positional relationship between the capturing camera and the captured camera are known, the positional relationship between the reference camera and the captured camera can be calculated. However, if the reference camera is the captured camera, the positional relationship between the reference camera and the captured camera is already included in the relative position information 60. Accordingly, the data judgement unit 54 judges whether or not the captured camera of the piece of relative information is the reference camera of the piece of relative position information (S99).

If the judgement is positive in the step S99 (S99: YES), the data judgement unit 54 discards the piece of relative information (S101).

If the judgement is negative in the step S99 (S99: NO), the positional relationship between the reference camera and the captured camera is not included in the relative position information 60. Accordingly, in order to calculate this positional relationship, the data judgement unit 54 outputs the piece of relative information to the relative information conversion operation unit 56 (S105).

Performing the above-described processing allows an operation such as addition of a record to the relative position information 60 in the case where the capturing camera is the reference camera or one of the target cameras included the relative position information 60, using the piece of relative information.

(iii) Even in a case where the capturing camera of the piece of relative information is neither the reference camera nor any of the target cameras of the relative position information 60, if the captured camera of the piece of relative information is the reference camera or one of the target cameras of the relative position information 60, it is possible to add a record to the relative position information 60, using the piece of relative information. Accordingly, if the judgement is negative in the step S97 (S97: NO), the data judgement unit 54 controls the output destination of the piece of relative information based on whether or not the captured camera is either the reference camera or one of the target cameras of the relative position information 60.

Specific explanation is given below. In the step S97, if the capturing camera of the piece of relative information does not exist among the target cameras of the relative position information 60 (S97: NO), the data judgement unit 54 judges whether or not the captured camera of the piece of relative information is the reference camera (S103).

If the judgement is positive in the step S103 (S102: YES), that is, if the captured camera is the reference camera (which means that the capturing camera captures the reference camera), the data judgement unit 54 outputs the piece of relative information to the relative information conversion operation unit 56 (S105).

(iv) if the judgement is negative in the step S103 (S103: NO), the data judgement unit 54 refers to the target cameras included in the records of the relative position information 60 and judges whether the captured camera of the piece of relative information is included among the target cameras of the relative position information 60 (S107).

If the judgement is positive in the step S107 (S107: YES), because the captured camera is the reference camera, and the positional relationship between the reference camera and the target camera and the positional relationship between the capturing camera and the captured camera are known, the positional relationship between the reference camera and the capturing camera can be calculated. Accordingly, the data judgement unit 54 outputs the piece of relative information to the relative information conversion operation unit 56 (S105).

If the judgement is negative in the step S107 (S107: NO), this piece of relative information has no connection with the records included in the relative position information 60. Accordingly, it is not possible to add a record to the relative position information 60. Thus, the data judgement unit 54 returns the piece of relative information to the data management unit 53 (S111). It should be noted that the data management unit 54 registers the returned piece of relative information at the end of the queue.

3.5 Details of Operations of Relative Information Conversion Operation Unit 56

The following describes the conversion operation that is performed by the relative information conversion operation unit 56 after a piece of relative information is output to the relative information conversion operation unit 56 in the step S105. The conversion operation is performed in the following three cases:

(i) the case where the judgement is negative in the step S99 (S99: NO);

(ii) the case where the judgement is positive in the step S103 (S103: YES); and (iii) the case where the judgement is positive in the step S107 (S107: YES).

The relative information conversion operation unit 56, upon receiving the piece of relative information from the data judgement unit 54 (S105), controls how the conversion operation is performed in accordance with which of the above-mentioned three cases is the current case. In the following, (i) to (iii) are described in the listed order.

First, description is given on (i) the case where the judgement is negative in the step S99.

Figure 16:
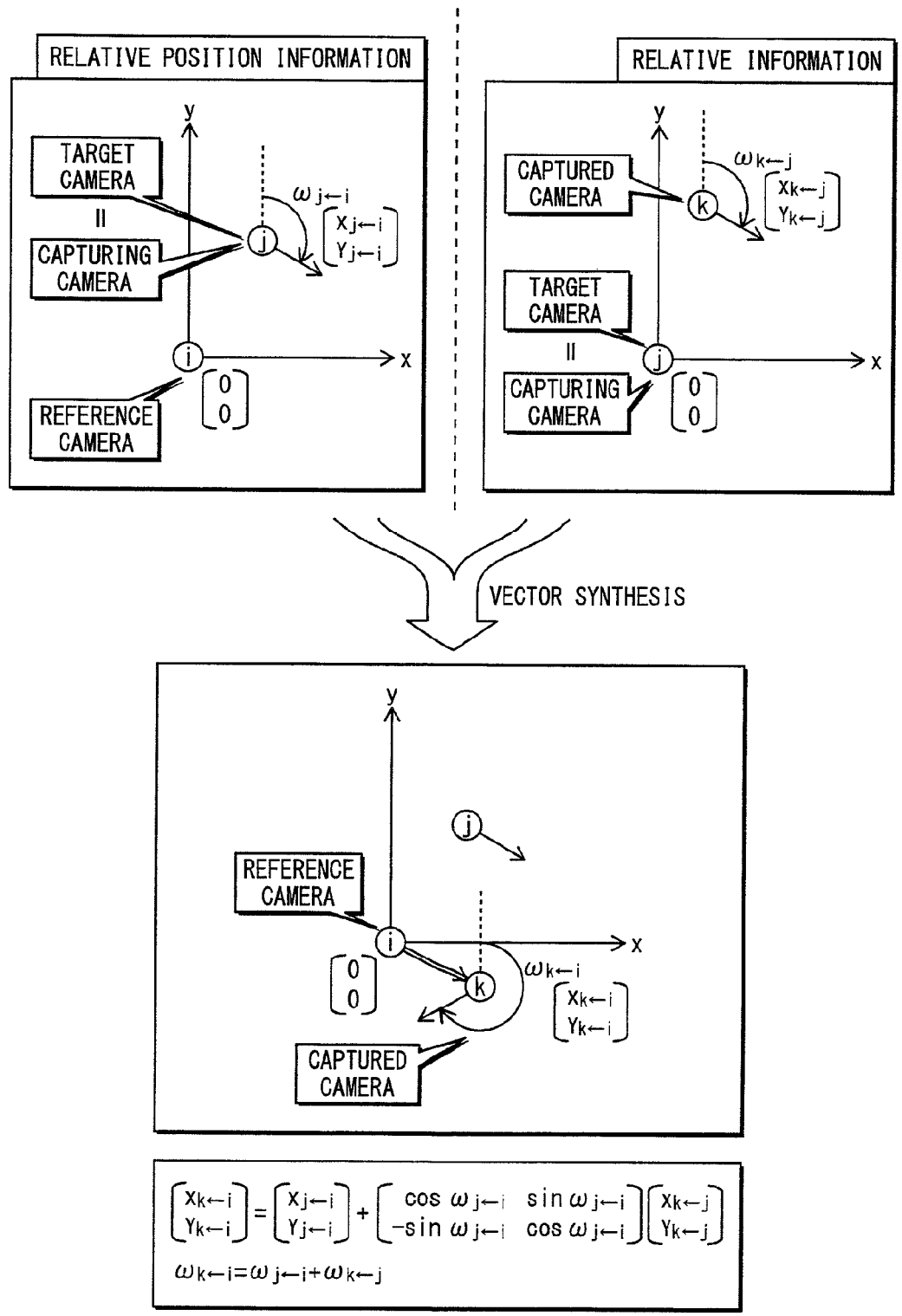
FIG. 16 shows how conversion operations are performed in a case where a target camera is the capturing camera.

FIG. 16 shows how the conversion operation is performed in a case where one of the target cameras is the capturing camera.

In FIG. 16, "i" represents the reference camera, "j" represents the target camera (capturing camera), and "k" represents the captured camera. It should be noted that in the following description, for example, if there are a camera "s" and a camera "t", coordinates of the camera "s" indicated in a coordinate system of an xy-plane with reference to the camera "t" is expressed as (Xs_t, Ys_t). It should be noted that the y-axis indicates the capturing direction of the camera which is referred to as the reference of the coordinate system. Additionally, when an angle is expressed as Ws_t, it indicates a direction in which the camera "s" faces in the camera coordinate system with reference to the camera "t". Note that in FIGS. 16-18, an arrow is illustrated instead of each low line "_" in the coordinates (Xs_t, Ys_t) or the angle Ws_t. In addition, in FIGS. 16-18, the angle Ws_t is expressed using an omega.

The following is a description using FIG. 16. The relative information conversion operation unit receives a piece of relative information transmitted from the data judgement unit 54 after the data judgement unit 54 makes the negative judgement in the step S99. The relative information conversion operation unit 56 refers to the relative position information 60 and searches the records included in the relative position information 60 for a record whose target camera is the capturing camera of the piece of relative information. The record searched for indicates the positional relationship between the reference camera and the target camera (capturing camera). Accordingly, by performing a vector synthesis with respect to (a) the record which was searched from the relative position information 60 and indicates the coordinates and the direction of the target camera (capturing camera) relative to the reference camera and (b) the piece of relative information received from the data judgement unit 54 (coordinates and the direction of the captured camera relative to the capturing camera), the coordinates and the direction of the captured camera relative to the reference camera can be obtained. The details are as shown in FIG. 16, and the coordinates of the captured camera "k" (Xk_i, Yk_i) and the direction "Wk_i" based on the camera coordinate system with reference to the reference camera "i" are namely as follows.

$$Xk\_i = Xj\_i + (\cos Wj\_i \cdot Xk\_j + \sin Wj\_i \cdot Yk\_j)$$

$$Yk\_i = Yj\_i + (-\sin Wj\_i \cdot Xk\_j + \cos Wj\_i \cdot Yk\_j)$$

$$Wk\_i = Wj\_i + Wk\_j$$

Upon obtaining the coordinates (Xk_i, Yk_i) and the direction Wk_i by calculation, the relative information conversion operation unit 56 generates a record to be added to the relative position information 60. The parameters included in the record are as follows. Namely, the reference camer 62 is "i", the target camera 63 is "k", the relative direction 63 is "wk_i", and the relative position 65 is "(Xk_i, Yk_i)". After generating this record, the relative information conversion operation unit 56 outputs the generated record to the relative position information management unit 55. The relative position information management unit 55 receives the output record and adds the received record to the relative position information 60.

Next, description is given on (ii) the case where the judgement is positive in the step S103.

FIG. 17 shows how the conversion operation is performed in a case where the reference camera is the captured camera. In FIG. 17, the reference camera (captured camera) is "i", and the capturing camera is "q". The case where the reference camera is the captured camera is, in other words, the case where the capturing camera captures the reference camera. Accordingly, in order to obtain the coordinates and the direction of the capturing camera in the camera coordinate system of the reference camera, calculate an inverse vector of the vector, indicated in the piece of relative information, which indicates the coordinates and the direction of the captured camera (reference camera) relative to the capturing camera. Details are as shown in FIG. 17, and the coordinates (Xq_i, Yq_i) and the direction Wq_i of the capturing camera "q" based on the camera coordinate system of the reference camera "i" are as follows.

$$Xq\_i = \cos Wi\_q \cdot (-Xi\_q) + (-\sin Wi\_q) \cdot (-Yi\_q)$$

$$Yq\_i = \sin Wi\_q \cdot (-Xi\_q) + \cos Wi\_q \cdot (-Yi\_q)$$

$$Wq\_i = 360 - Wi\_q$$

Upon performing the conversion operation, the relative information conversion operation unit 56 generates a record to be added to the relative position information 60. The parameters included in the record are as follows. Namely, the reference camera 62 is "i", the target camera 63 is "q", the relative direction 63 is "wq_i", and the relative position 65 is "(Xq_i, Yq_i)". The relative information conversion operation unit 56 outputs the generated record to the relative position information management unit 55.

Next, description is given on (iii) the case where the judgement is positive in the step S107.

Figure 18:
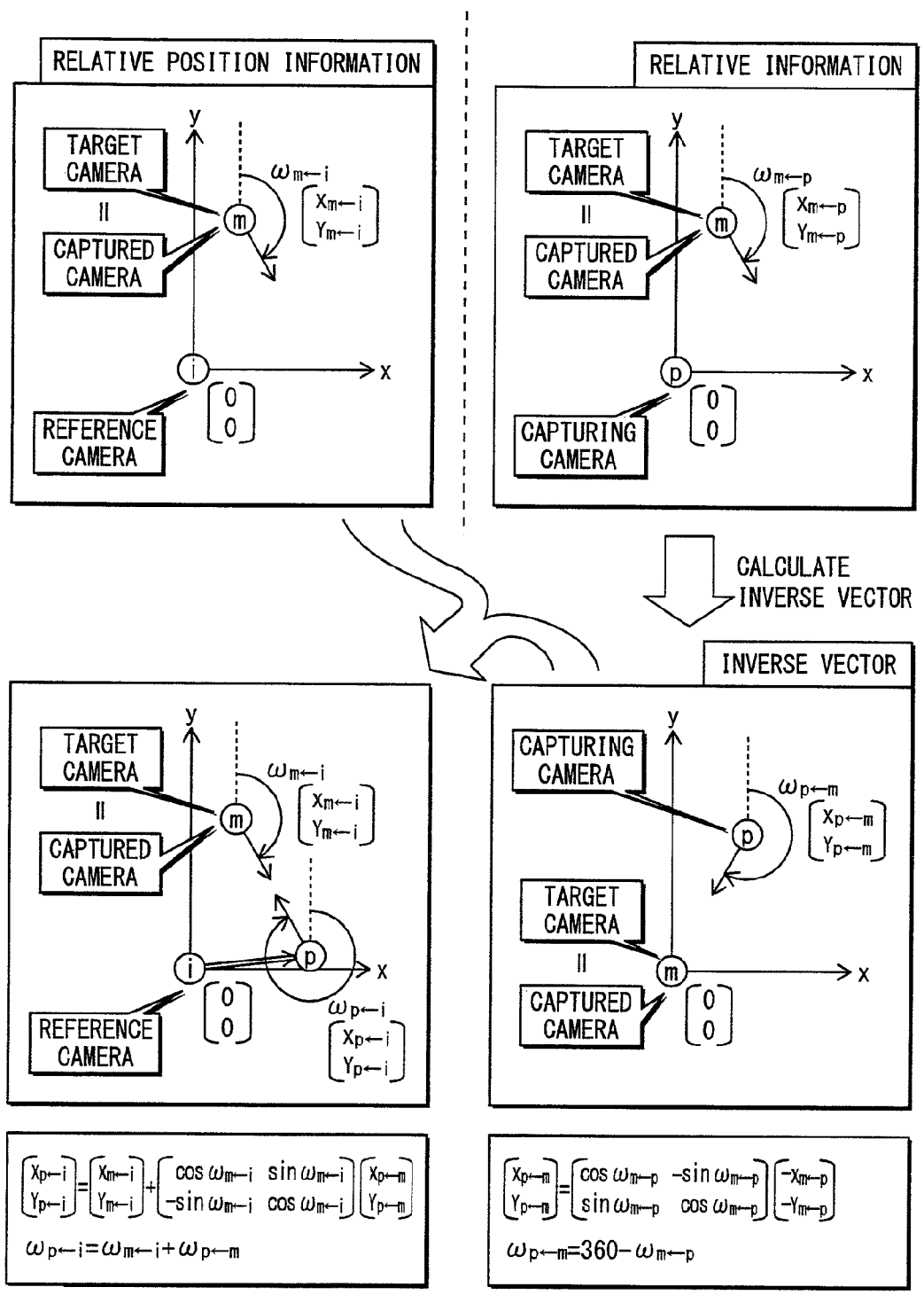
FIG. 18 shows how conversion operations are performed in a case where the target camera is the captured camera.

FIG. 18 shows how the conversion operation is performed in a case where one of the target cameras is the captured camera. In FIG. 18, the reference camera is "i", the target camera (captured camera) is "m", and the capturing camera is "p". In this case, an inverse vector of the vector which indicates the coordinates and the direction of the captured camera (target camera) using the camera coordinate system of the capturing camera is determined first. As a result, the coordinates and the direction of the capturing camera using the camera coordinate system of the captured camera (target camera) are determined. After that, it is the same as the case shown in FIG. 16. Details are as shown in FIG. 18. The coordinates (Xp_i, Yp_i) and the direction Wp_i of the capturing camera "p" based on the camera coordinate system of the reference camera "i" are as follows.

$$Xp\_i = Xm\_i + \cos Wm\_i \cdot Xp\_m + \sin Wm\_i \cdot Yp\_m$$

$$Yp\_i = Ym\_i + (-\sin Wm\_i) \cdot Xp\_m + \cos Wm\_i \cdot Yp\_m$$

$$Wp\_i = Wm\_i + Wp\_m$$

Here, as shown in the figure, Xp_m, Yp_m, and Wp_m are as follows.

$$Xp\_m = \cos Wm\_p \cdot (-Xm\_p) + (-\sin Wm\_p) \cdot (-Ym\_p)$$

$$Yp\_m = \sin Wm\_p \cdot (-Xm\_p) + \cos Wm\_p \cdot (-Ym\_p)$$

$$Wp\_m = 360 - Wm\_p$$

Upon performing the conversion operation, the relative information conversion operation unit 56 generates a record to be added to the relative position information 60. The parameters included in the record are as follows: the reference camera 62 is "i", the target camera 63 is "p", the relative direction 63 is "Wp_i", and the relative position 65 is "(Xp_i, Yp_i)". The relative information conversion operation unit 56 outputs the generated record to the relative position information management unit 55.

Described above are the operations of the positional relationship calculation unit 7.

3.6 Operations of Image Selection Support Unit 8

The following describes operations of the image selection support unit 8.

The image selection support unit 8 acquires relative position information 60 pertaining to a prescribed time from the relative position information management unit 55.

Figure 19:
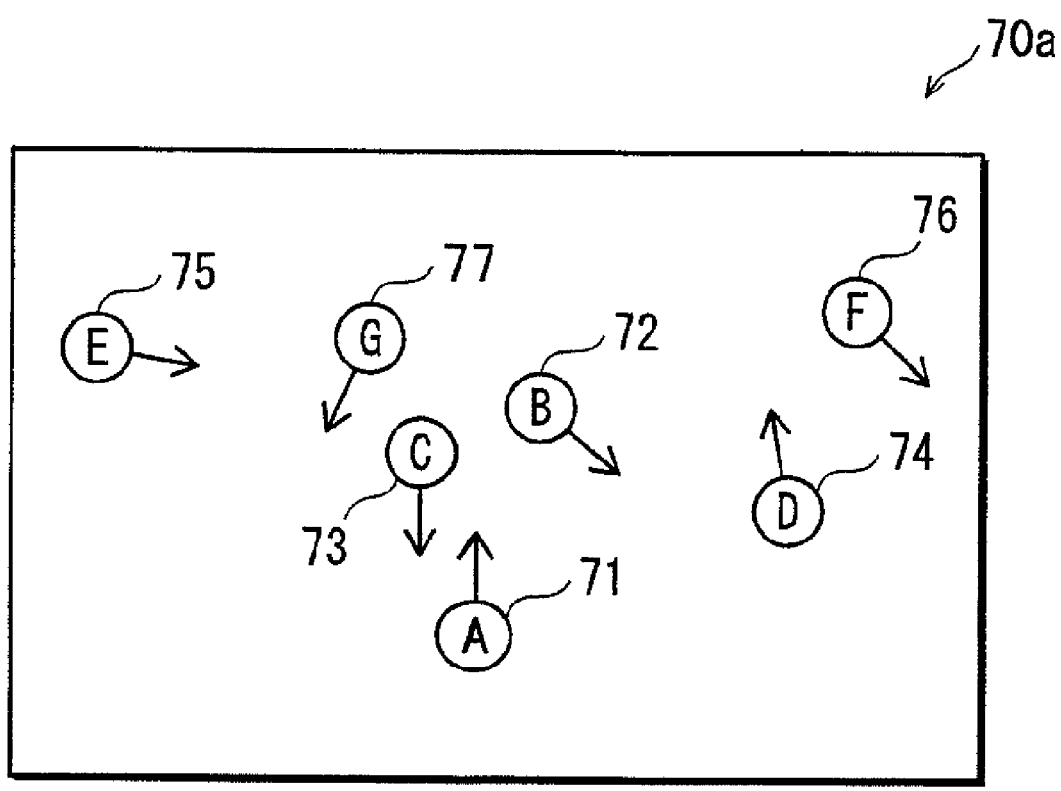
FIG. 19 shows an example of an image generated by an image selection support unit 8.

The image selection support unit 8 refers to the target camera 63, relative direction 64, and relative position 65 of each record included in the acquired relative position information 60 and generates an image indicating relative positional relationships, relative to one camera, of other cameras. FIG. 19 shows an example of an image generated in the above-mentioned manner by the image selection support unit 8.

An image 70a in FIG. 19 indicates coordinates and directions of cameras relative to a camera "A" as a reference. In FIG. 19, reference characters such as "A" and "B" indicate cameras (camera A, camera B, . . . ). More specifically, a camera 71 is the camera A, and a camera 72 is the camera B. Similarly, a camera 73 is a camera C, a camera 74 is a camera D, a camera 75 is a camera E, a camera 76 is a camera F, and a camera 77 is a camera G. Additionally, in FIG. 19, each arrow extending from a reference character indicating a camera, such as "A" or "B" indicates the direction of the camera.

Figure 20:
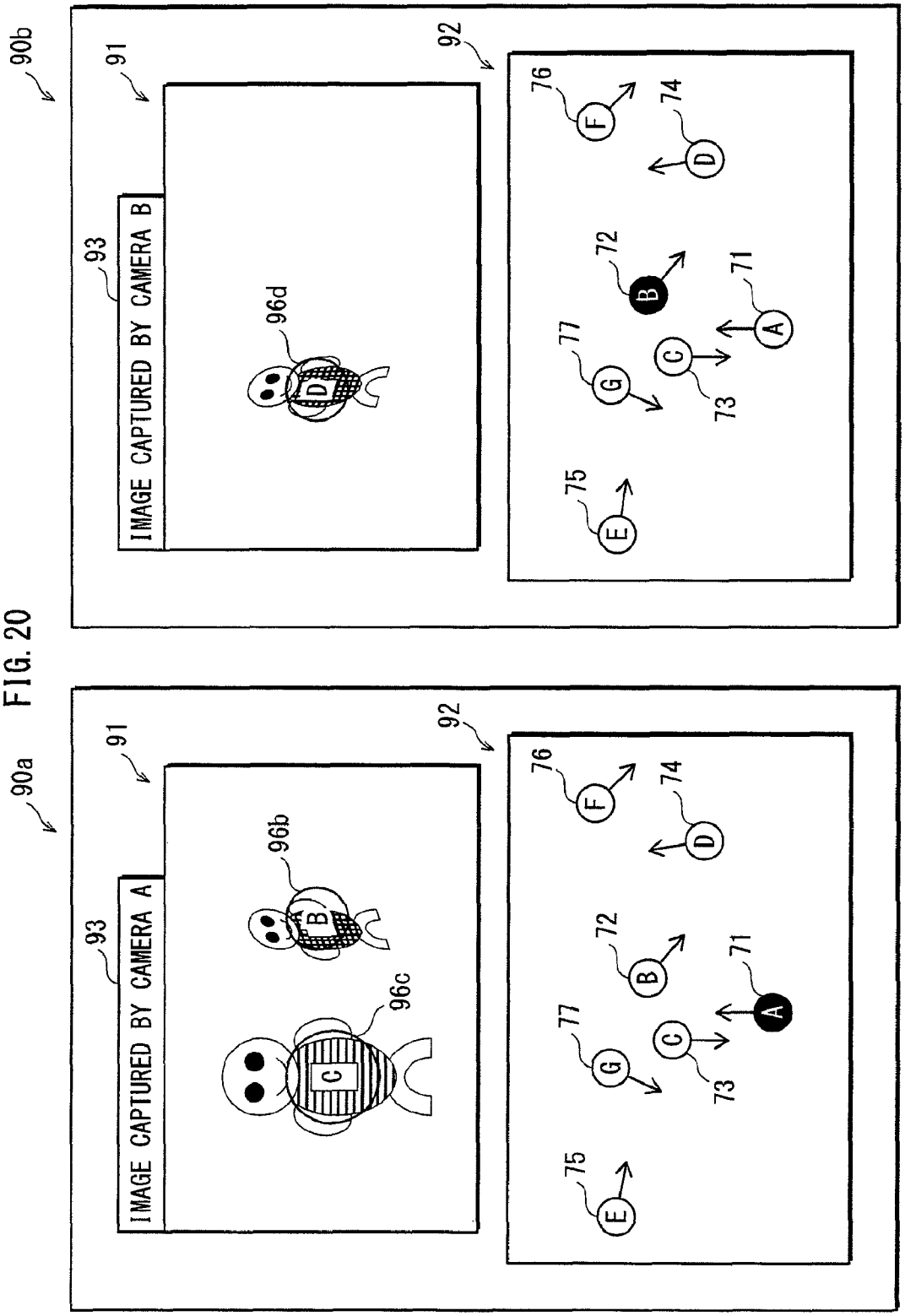
FIG. 20 shows an example of a user interface.

Having generated the image indicating the positional relationships among the cameras, the image selection support unit 8 generates, using the generated image, a user interface for a user to perform an image selection. FIGS. 20 and 21 each show an example of a user interface.

A user interface 90 (as an example of the user interface, FIG. 20 shows two user interfaces 90a and 90b, and FIG. 21 shows two user interfaces 90c and 90d) includes a captured image display area 91, a camera positional relationship display area 92, and a camera identification information display area 93.

The captured image display area 91 is an area for displaying a captured image captured by a camera selected by the user. The image selection support unit 8 identifies the captured image to be displayed by comparing the time 61 of the relative position information 60 and the metadata of the captured image with use of the identifier of the selected camera, reads the identified captured image, and displays the read captured image.

It should be noted in the present embodiment, not only the captured image is displayed, but also image data (camera identification image 96) for identifying the captured camera captured in the captured image is displayed by being overlaid on the captured image.

The camera identification image 96 can be displayed in various modes.

For example, a circular image containing the image of the captured camera at the center thereof may be overlaid on top of information for identifying the captured camera, and these two may be displayed as the camera identification image 96. This allows the user to easily recognize the captured camera in the captured image and to easily identify which camera is the captured camera. Alternatively, various other methods such as color and shape can be used to specify and identify the cameras.

In a case where the cameras are identified by color, the same color may be used for the same camera to allow the user to easily recognize the positional relationships among the cameras. Specifically, a color for identifying a camera in the camera identification image 96 may be assigned to the camera in the camera positional relationship display area 92. Also, the color of the reference camera in the camera positional relationship display area 92 may be used as the color of the frame of the captured image display area 91 (a frame of the captured image) or as the color of the camera identification information display area 93. Consequently, which camera has captured the captured image being displayed in the captured image display area 91 can be easily identified.

It should be noted that the position of the captured camera within the captured image has been already specified by image recognition performed by the image recognition unit of the relative information calculation unit 6. Accordingly, a display position of the camera identification image 96 can be determined based on the specified position. Alternatively, the following method can be used: the piece of relative information is referred to and an area in which the captured image is captured is estimated in the captured image, based on the coordinates of the captured camera in the camera coordinate system relative to the capturing camera as the reference; and the camera identification image 96 may be displayed in the estimated area. This estimation can be performed if the parameters such as the focal distances of the cameras are known.

Alternatively, the camera identification image 96 can be displayed in a mode which allows an identification of a distance between the capturing camera, which has captured the capturing image, and the captured camera. Various methods can be applied, such as, varying the size or the color of the camera identification image 96 in accordance with the distance between the capturing camera and the captured camera.

For example, the user interface 90a indicates a camera identification image 96b and a camera identification image 96c. The camera identification image 96b indicates that the captured camera is the camera B, and the camera identification image 96c indicates that the captured camera is the camera C.

It should be noted that while FIG. 20 shows identifiers of the respective cameras, names of wearers of the captured cameras (people, etc.) can be displayed instead.

The camera positional relationship display area 92 is an area for displaying an image which shows, relative to one camera as the reference, coordinates and a direction of each of other cameras (the image 70a etc. shown in FIG. 19). The image selection support unit 8 associates each reference sign (camera 71 etc.) indicating a camera and the captured image captured by the camera. In the user interface 90, if the user selects a reference sign of the camera 71 or the like, the captured image which has been captured by the selected camera will be displayed in the captured image display area 91.

It should be noted that (a) each camera identification image 96 displayed in the captured image display area 91 and (b) the captured image captured by the captured camera indicated by the camera identification image 96 may be associated with each other in advance, and when the camera identification image 96 is selected by a user, the captured image corresponding to the camera identification image 96 may be displayed in the captured image display area 91. For example, in the case of the user interface 90*a*, when the camera identification image 96*c* is selected by the user, the captured image of the camera C is displayed in the captured image display area 91.

It should be noted that in FIG. 20, in order for the user to easily recognize which camera is selected, the image selection support unit 8 displays the camera selected by the user in a manner which differentiates the selected camera from other cameras. For example, as shown in the figure, the selected camera may be displayed inverted in the camera positional relationship display area 92.

The camera identification information display area 93 is an area for displaying which camera has captured the captured image being displayed in the captured image display area 91. In other words, the camera identification information display area 93 is an area for displaying the camera selected by the user.

Note that the user interface 90*a* in FIG. 20 shows an exemplary case where the user has selected the camera A. Similarly, the user interface 90*b* shows an exemplary case where the user has selected the camera B, the user interface 90*c* in FIG. 21 shows an exemplary case where the user has selected the camera C, and the user interface 90*d* shows an exemplary case where the user has selected the camera D.

The image selection support unit 8 generates the user interface 90 described above and makes the display unit 3 display the generated user interface 90. Note that an operation reception unit for receiving a camera selection operation by the user may take various forms. For example, the display unit 3 can be a touch panel for receiving user operations. In this case, when the user selects one of symbols representing the cameras or camera identification images 96 displayed in the display unit 3 by touching the touch panel, the captured image of the selected camera is displayed in the captured image display area 91. Alternatively, the data processing apparatus 2 may have a operation reception unit (an input means such as a keyboard, mouse, touchpad, etc.), or the data processing apparatus 2 may receive user operations via a network.

Additionally, the captured images captured by the cameras may be displayed as thumbnails in the user interface 90.

(Generating Images Relative to the Selected Camera as the Reference)

In addition to the above description, the image selection support 8 may perform the following.

Specifically, each time the user selects a camera, the image selection support unit 8 may generate an image indicating coordinates and directions of other cameras relative to the selected camera as the reference, and displays the generated image in the camera positional relationship display area 92.

Figure 22:
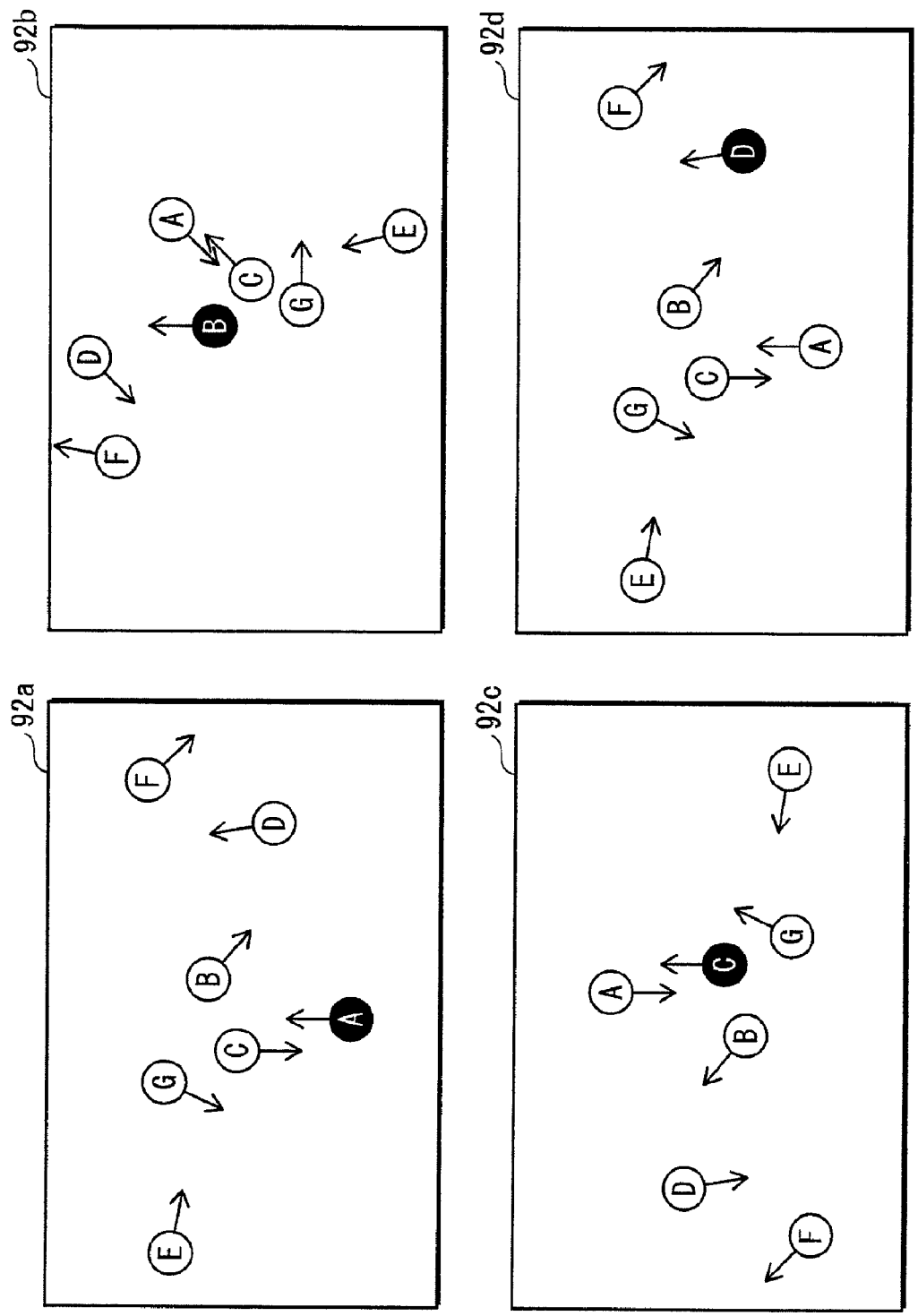
FIG. 22 shows positional relationships of cameras relative to one of the cameras.

FIG. 22 shows positional relationships of cameras relative to one of the cameras.

Each time a camera is selected, an image corresponding to the selected camera such as each image shown in FIG. 22 is displayed in the camera positional relationship display area 92. Note that a case in which the camera A is selected is indicated as a camera positional relationship display area 92*a*. Similarly, a case in which the camera B is selected is indicated as a camera positional relationship display area 92*b*, a case in which the camera C is selected is indicated as a camera positional relationship display area 92*c*, and a case in which the camera D is selected is indicated as a camera positional relationship display area 92*d*.

In order to generate such an image with reference to one camera, the following methods may be used. For example, each time a camera is selected, the positional relationship calculation unit 7 calculates a piece of relative position information 60 in which the selected camera is the reference camera, and generates the above-mentioned image. Alternatively, after generating an image which indicates positional relationships of cameras relative to one of the cameras, each time another one of the cameras is selected, the generated image can be rotated or enlarged/reduced in size to display the image indicated with the selected camera as the reference camera.

(Displaying the Direction of the Captured Camera)

Additionally, as shown in FIG. 23 as user interfaces 90*e* and 90*f*, a camera capturing direction 97 which indicates the direction (capturing direction) of a captured camera can be overlaid for display.

In the user interface 90*e*, for example, a camera capturing direction 97*b* uses an arrow to express the capturing direction of the camera B.

It should be noted that since the capturing direction of each camera is known from the relative position information 60 and each piece of relative information, associating directions and arrow-shaped images in advance or rotating the arrow-shaped images in accordance with the directions allows the camera capturing direction 97 to be overlaid for display.

(Displaying Hidden Cameras)

Also, in the captured image display area 91, for example, as shown in the captured image display area 91 of the user interface 90*e*, a camera identification image 96 can be displayed for a camera which is hidden behind an object or the like (for example, the camera G behind the camera C). it should be noted that the camera identification image 96 maybe displayed in a manner which allows recognition of the hidden camera. For example, in the case of the user interface 90*e*, a circular image surrounded by a dotted line is displayed as a camera identification image 96*e*. In other words, it is preferable that each camera identification image 96 for a hidden camera be displayed in a different mode from each camera identification image 96 for an unhidden camera. In this case, the direction of the hidden camera (camera capturing direction 97*g*) may or may not be displayed. It should be noted that the position, in the captured image, of a hidden camera is identified as follows. First, it is judged whether a hidden camera exists or not (judgement method is described later). If the judgement is affirmative, the hidden camera is identified. After that, the image selection support unit 8 refers to the relative position information 60 which uses the capturing camera of the captured image as the reference camera, and specifies the position of the hidden camera in the captured image, using coordinates of the hidden camera and camera parameters of the capturing camera (information such as an image-capturing range indicated by the focal distance) which are indicated in the relative position information 60. Following that, a camera identification image 96 is displayed in the position as specified above, in a manner that allows recognition of a camera being hidden.

The following is an example of judging whether there is a hidden camera or not. One or more cameras within the image-capturing range of the capturing camera are extracted with respect to a captured image. The image selection support unit 8 generates relative position information 60 whose reference camera is the capturing camera, and if the angle of view of the capturing camera is known, cameras within the image-capturing range can be extracted. After that, the captured camera which has been identified as the captured camera by image recognition is identified. Excluding the captured camera from the cameras within the image-capturing range results in the identification of the hidden camera.

The following explanation is made with reference to the user interface 90e in FIG. 23. The image-capturing range of the camera A (capture range 94a) includes the cameras B, C, and G, and these cameras are extracted. In the captured image of the camera A, the cameras B and C are captured as captured cameras. Excluding the captured cameras from the extracted cameras B, C, and G leaves the camera G. This camera G is identified as the hidden camera.

Here, whether a hidden camera exists or not may also be judged as follows. In the example below, whether there is a camera hidden behind another camera can be determined.

Specifically, the image selection support unit 8 makes the positional relationship calculation unit 7 calculate relative position information 60 whose reference camera is the camera that has captured the captured image being displayed in the captured image display area 91 (the camera A in the case of the user interface 90e). After that, the image selection support unit 8 identifies captured cameras in the captured image of this reference camera (the cameras B and C in the case of the same figure). For example, the captured cameras can be identified by referring to pieces of relative information whose reference camera is the capturing camera.

Upon identifying each captured camera, the image selection support unit 8 determines a straight line that passes through the origin and the coordinates of one of the captured cameras (in the case of the same figure, a straight line passing through the coordinates of the cameras A and B, and a straight line passing through the coordinates of the cameras A and C). The image selection support unit 8 judges whether any other cameras exists or not in an area indicated by straight lines having a slope within a predetermined range with respect to the slope of the aforementioned straight line.

If the image selection support unit 8 judges affirmatively, and the distance between the camera which has been judged to exist in the area and the reference camera is longer than the distance between the captured camera pertaining to the straight line and the reference camera, the image selection support unit 8 judges the camera to be hidden behind the captured camera.

Figure 24:
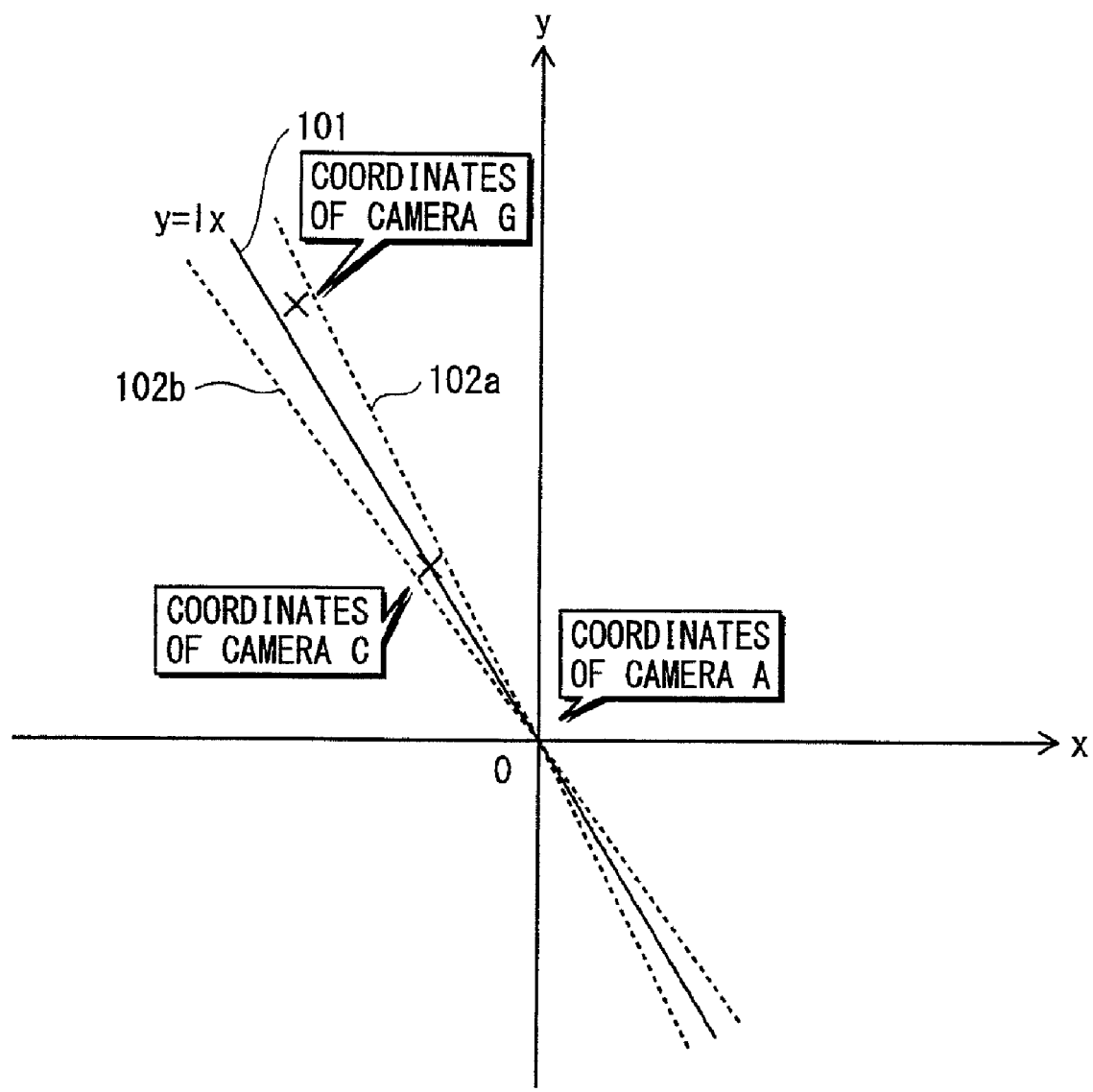
FIG. 24 shows a method for judging presence/absence of a camera hidden behind a captured camera.

The following gives brief explanation on this judgement processing using FIG. 24.

FIG. 24 shows a method for judging presence/absence of a camera hidden behind a captured camera.

As is the exemplary case above, the camera A is the reference camera, and the camera C is the captured camera.

A solid line 101 indicates a straight line passing through the coordinates of the camera A (origin) and the coordinates of the camera C. Dotted lines 102a and 102b are the straight lines which have a slope within a predetermined range with respect to the slope of the solid line and indicate the area. The camera G exists in the area indicated by the dotted lines 102a and 102b, as shown in the figure. In this case, the image selection support unit 8 judges that the camera G is hidden behind the captured camera (camera C).

(Displaying the Image-Capturing Range)

The image-capturing ranges of the cameras may be displayed in the user interface 90. In the example in FIG. 23, each capture range 94 indicates an image-capturing range of a camera displayed in the camera positional relationship display area 92. In the example of the user interface 90e, a capture range 94a indicates the image-capturing range of the camera A, and in the example of the user interface 90f, a capture range 94b indicates the image-capturing range of the camera B.

Also, cameras maybe displayed in a manner that cameras outside the image-capturing range and cameras within the image-capturing range are distinguishable from each other. For example, FIG. 23 indicates within-capture range images (98b and 98c). Further, if a camera within the image-capturing range is hidden behind another camera, the camera may be displayed in a distinguishable manner from unhidden cameras within the image-capturing range. In the case of the user interface 90e, as an example, the camera G is indicated to be a hidden camera by being displayed in a different mode from that of the within-capture range 98b, namely, with use of a dotted line 99 (99g).

<Second Embodiment>

The following describes a second embodiment.

A display terminal 1000 pertaining to the second embodiment of the present invention is a computer system constituted from a microprocessor, a ROM, a RAM, a hard disk unit, a display unit, a keypad, an adaptor, a speaker, and the like. The ROM or the hard disk unit has computer programs stored therein. The stored computer programs are read onto the RAM, and the display terminal 1000 achieves its functions by the microprocessor operating according to the computer programs.

Figure 25:
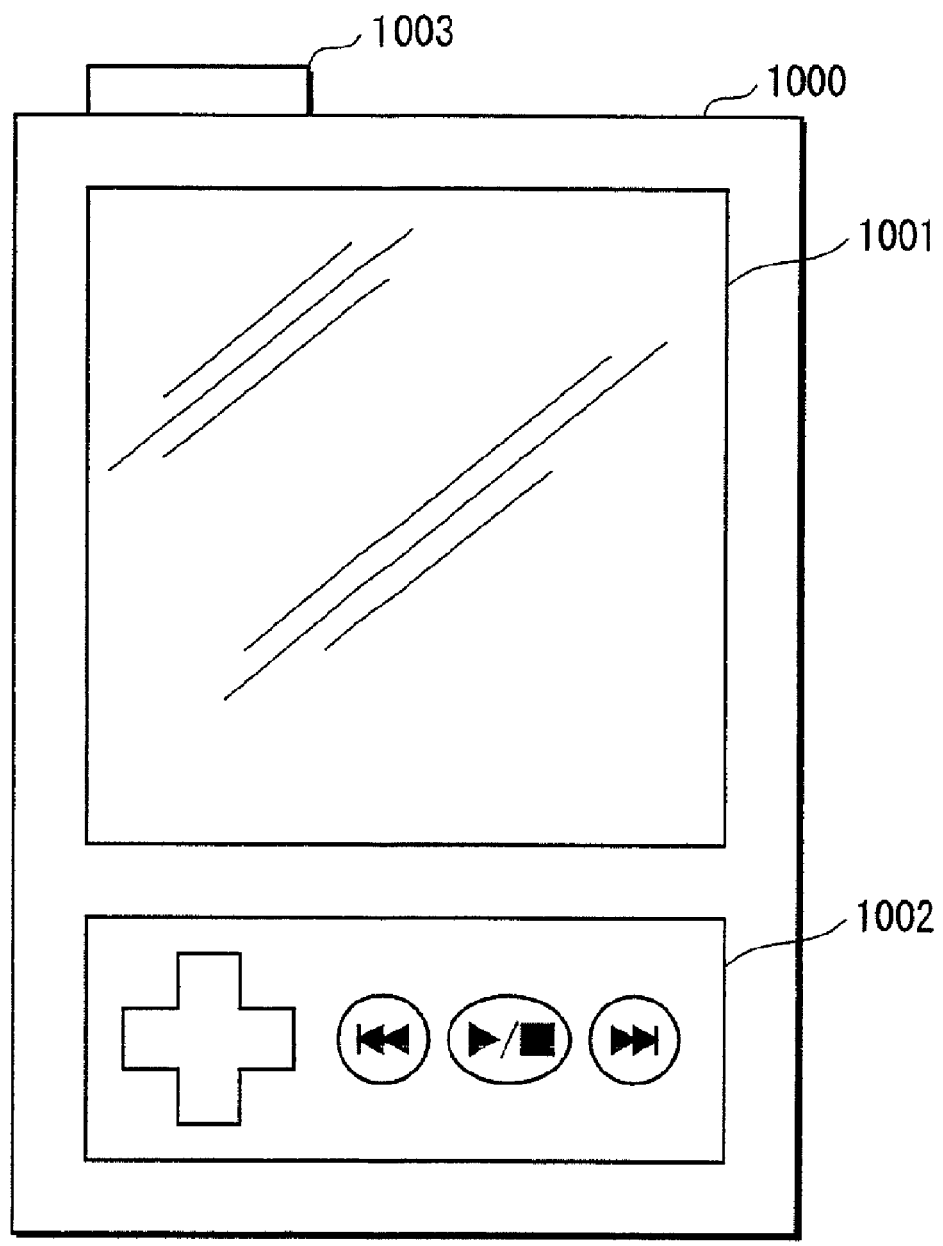
FIG. 25 shows an exterior of a display terminal 1000.

An exterior of the display terminal includes a display 1001, a keypad 1002, and an adaptor 1003, as shown in FIG. 25.

Specifically, the display terminal 1000 includes a structure described as the data processing apparatus 2 in the first embodiment. In the first embodiment, the data processing apparatus 2 and the display unit 3 are separated from each other. However, the display terminal 1000 not only includes the data processing apparatus 2 but also includes the display unit as the display 1001. It should be noted that the display terminal 1000 calculates positional relationships among cameras using the structure equivalent to the data processing apparatus 2, and displays, on the display 1001, the calculated positional relationships as positional relationships among users wearing the cameras. The display terminal receives a designation of a user via the keypad 1002 and displays, on the display 1001, the image captured by the camera worn by the designated user.

The display 1001 displays such as positional relationships among users, which have been calculated by internal processing of the display terminal 1000, or an image captured by the camera worn by the user designated via an operation of the keypad 1002. Here, if the display 1001 is a touch panel, the user can be designated by designating the position of the user in the positional relationships among the users displayed by the display 1001 or in an image, displayed by the display 1001, captured by a camera worn by another user.

The keypad 1002 is operated to achieve, for example, the following: setting users and a time period pertaining to the calculation, of the positional relationships among the users, performed by the internal processing of the display terminal; designating users, among users displayed on the display, for whom a positional relationship is calculated; issuing an instruction to successively display positional relationships among the users or images captured by the cameras worn by the users; and issuing an instruction to stop the successive display and instead display one of positional relationships among the users.

The adaptor 1003 is an Internet adaptor, a card slot or the like, and the display terminal 1000 acquires such as images captured by the cameras worn by users, via the adaptor 1003. The display terminal 1000 performs, for example, calculation of positional relationships among the users by internal processing, using the images captured by the cameras worn by the users, which have been acquired via the adaptor 1003.

The display terminal 1000 performs the processing described in the first embodiment, by internal processing. In the case where the images captured by the cameras worn by the users are acquired in a temporally successive manner, for example, as a moving image, images captured at the same point in time are extracted first. After that, positional relationships among the users are calculated using the method described in the first embodiment, based on the extracted captured images. The display terminal 100 then instructs the display 1001 to successively display the successively calculated positional relationships among the users.

Here, if a position of a user (relative position with respect to another user) cannot be calculated, the position can be interpolated using information on positional relationships between these two users prior to or subsequent to the time at which the positional relationship between these two was unable to be calculated.

There are various interpolating methods: one example is to use a midpoint between the calculated position of the user immediately prior to and the calculated position of the user immediately subsequent to the time at which the positional relationship was unable to be calculated; and another example is to use curve approximation based on the positions of the user prior to and subsequent to the time at which the positional relationship was unable to be calculated.

Alternatively, sensing data of a sensor which measures movement of a user, such as an acceleration sensor or a speed sensor, can be used to interpolate the user position which was not able to be calculated.

It should be noted that while the above-described case shows an example where the display 1001 is constituted from one screen, the display 1001 maybe constituted from multiple screens. For example, the display 1001 may be constituted from two screens, and in this case, one screen displays positional relationships among the users, and the other screen displays the image captured by the camera worn by the designated user. Also, in this case, internal processing of the display terminal 1000 issues an instruction to divide a display target into multiple screens.

Note that in the above-described embodiment, the exterior of the display terminal 1000 has been described using the example shown in FIG. 25. However, it is not limited to this, and for example, the display terminal 1000 can be a terminal such as a personal computer, a PDA, or an electronic organizer.

Note that in the above-described embodiment, the display terminal 1000 includes all of the following: the adaptor 1003 which acquires images captured by cameras worn by users; a part which calculates positional relationships among the users by internal processing; the keypad 1002 for operating processing of the terminal; and the display 1001 which displays calculated positional relationships among the users or an image captured by the camera worn by the designated user. However, a system in which the display terminal 1000 includes part of the above, and other devices include the rest is applicable. An example is a structure shown in FIG. 26.

Figure 26:
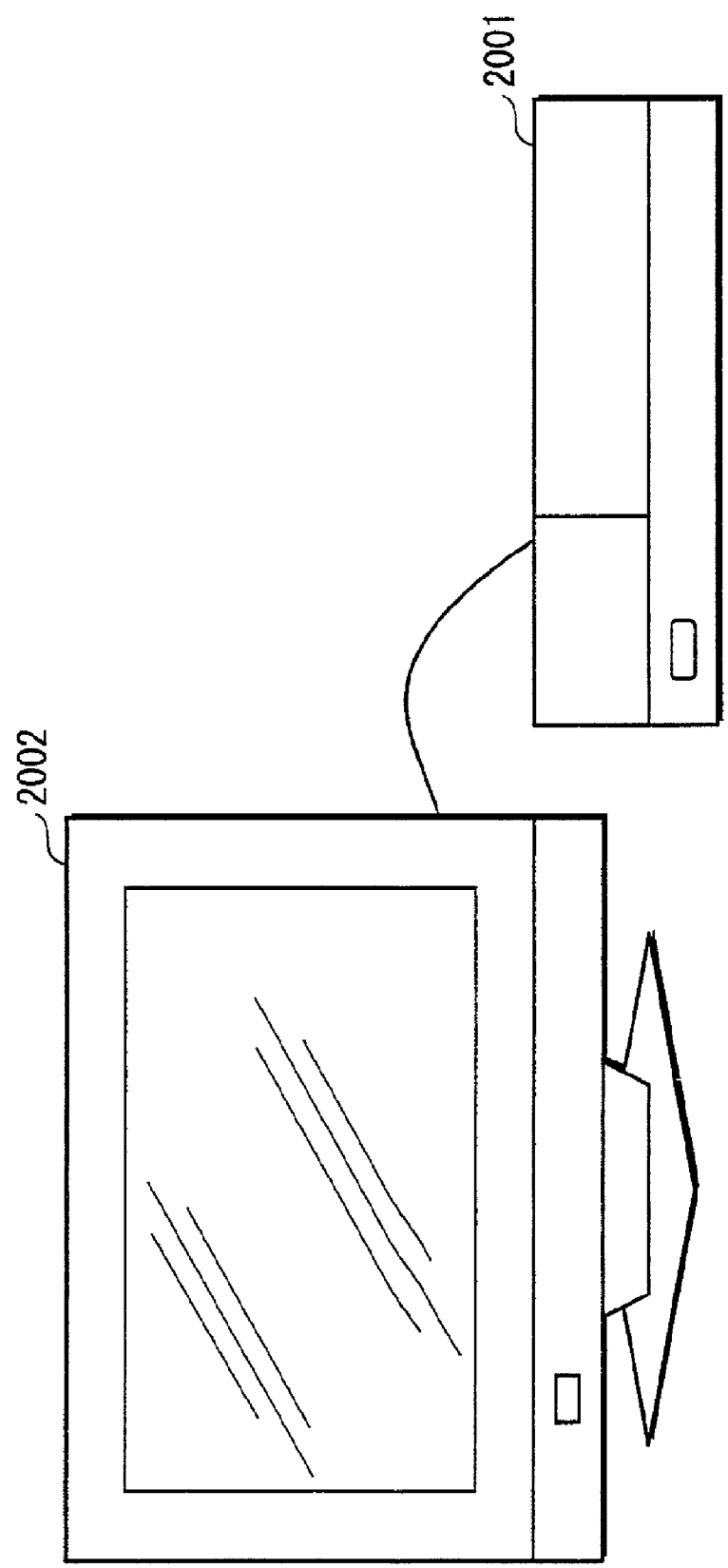
FIG. 26 shows a structure of a data processing system.

The system shown in FIG. 26 is composed of an STB (Set Top Box) device 2001, a TV device 2002, and a controller (not depicted).

The STB 2001 is an HDD recorder, a DVD recorder, or AV components, and includes, of the display terminal 1000 described above, the adaptor 1003 which acquires images captured by the cameras worn by the users and the part which calculates positional relationships among the users by internal processing.

The TV device 2002 which is a PDP, an LCD, or the like is connected to the STB, and includes, of the display terminal 1000 described above, the display 100 which displays calculated positional relationships among the users or an image captured by the camera worn by the designated user.

The controller operating the STB or the TV device includes the keypad 1002 for operating processing of the terminal.

<Modifications>

(1) Captured Camera Identification Unit 15

(1-1) Identification Method

In the above-described embodiments, two-dimensional codes are used to identify captured cameras in a captured image. However, a method for identifying captured cameras is not limited this, and various methods using, for example, colors, shapes of the two-dimensional markers 30, characters, and patterns, maybe applicable. In short, captured cameras can be identified as long as each camera has been assigned information unique to the camera.

For example, colors may be assigned to cameras, respectively, in order to identify the cameras, and each of the cameras which is provided with a two-dimensional marker 30 can be identified by the color of the two-dimensional marker 30 (or the camera identification area 31) provided therefor.

Similarly, assigning shapes of the two-dimensional marker 30 to the cameras in one-to-one correspondence enables the cameras to be identified by these shapes.

(1-2) Image Recognition Target

Also, in the above-described embodiment, two-dimensional markers 30 provided to the cameras are detected by image recognition performed by the image recognition unit 14. However, the method is not limited to using the two-dimensional markers 30. Since the image recognition is performed to identify the captured cameras, targets of the image recognition are not limited to the two-dimensional markers 30, but can be such as the captured cameras themselves or the users wearing the captured cameras.

For example, each captured camera itself in an captured image may be identified by image recognition, or image recognition may be performed on a characteristic part such as the face or clothes of each user wearing a captured camera, to identify each captured camera. Specifically, for example, an identification marker can be attached on clothes of each user. In this case, even if a captured camera is hidden, in the captured image, behind the user wearing the captured camera, the captured camera can be identified by the identification marker.

(2) Captured Camera Information Calculation Unit 16

In the above-described embodiment, the captured camera information calculation unit 16 has been described to calculate a positional relationship between a captured camera and a capturing camera.

Here, although the positional relationship has been described as coordinates and a direction of a camera with respect to another camera, it may be either the coordinates or the direction. For example, in a case where each camera changes its direction (capturing direction) but does not move much itself, it is not necessary to calculate coordinates of other cameras. One such example is a case where cameras are fixed in their respective positions.

Thus, in the present invention, the positional relationship calculation unit 7 may calculate only directions of other cameras without calculating their coordinates.

Also, as opposed to this, the positional relationship calculation unit 7 may calculate only coordinates of other cameras and calculate relative positional relationships. One such example is a case where the directions of the cameras are fixed in the same direction.

(3) Reference Camera Setting Unit 52

Although the reference camera is set by the reference camera setting unit 52 in the above-described embodiments, it can also be set as follows.

(3-1) Setting the Reference Camera Based on Amount of Calculation

For example, each piece of relative information registered in a queue is referred to, to estimate an amount of calculation required to generate relative position information 60 under the assumption that the capturing camera or the captured camera included in the piece of relative information is the reference camera. After that, the reference camera is set based on the estimated amounts of calculation. For example, a camera for which the estimated amount of calculation was the smallest can be set as the reference camera.

(3-2) Setting the Reference Camera Based on Designation

Alternatively, the same one camera may be set as the reference camera.

Or, the reference camera may be set as designated by the user. The relative position information 60 maybe generated each time the user designates a reference camera.

(4) Generation Method of Relative Information

In the above-described embodiments, the relative information calculation unit 6 acquires captured images of the cameras and generates a piece of relative information for each of the captured images.

Not limited to this, relative information can be generated outside the data processing apparatus 2. For example, a structure in which each camera generates relative information and the data processing apparatus 2 receives captured images and relative information from each camera. In other words, the relative information calculation unit 6 can be found outside the data processing apparatus 2.

(5) Captured Images

In the above-described embodiments, each camera captures a still image at a predetermined interval. However, each camera may capture moving images instead of still images.

In general, image resolution is lower in still-image capturing than in moving-image capturing. Also, in general, the higher the image resolution is, the more accurately the relative information can be calculated, which enables, for example, a two-dimensional marker at a relatively long distance to be detected in a captured image, as a result.

However, depending on a distance between cameras, even moving-image capturing with a lower resolution may allow sufficiently accurate calculation of relative positional relationships among cameras and relative positions and directions of cameras with respect to one of the cameras.

(6) Captured Camera Information Calculation Unit 16

In the above-described embodiments, the captured camera information calculation unit 16 calculates a positional relationship between a capturing camera and a captured camera based on the camera coordinate system of the capturing camera. Not limited to this, the captured camera information calculation unit 16 may calculate a positional relationship between the capturing camera and the captured camera based on the camera coordinate system of the captured camera. In other words, each piece of relative information may indicate coordinates and a direction of a capturing camera. Note that in this case, each piece of relative information indicates a relative direction and coordinates of the capturing camera in the coordinate system with reference to the captured camera, and accordingly, "capturing camera" and "captured camera" are interchanged in the description of the data judgement unit 54, the relative information conversion operation unit 56, and the like.

Also in the above-described embodiment, "2.5.6.2 Details of Captured Camera Identification Unit 15" describes using FIG. 7 that relative positions of a capturing camera and a captured camera are expressed as two-dimensional coordinates, ignoring the value "Y" on the Y-axis of the camera coordinate system. However, it is not limited to this, and the value on the Y-axis can be included. In other words, relative positions may be indicates using three-dimensional coordinate values.

(7) Updating the Set Time and Generating Relative Position Information 60

According to the description of the first embodiment above, relative position information 60 is generated based on pieces of relative information of the predetermined set time. However, the set time may be updated, and a piece of relative position information 60 can be generated at each set time. This way, even if there exists a undetermined camera whose coordinates and the like relative to the reference camera at a set time are undetermined, the coordinates of the undetermined camera at the set time can be interpolated, for example, as follows: each piece of relative position information before and after the set time is referred to; and, based on the coordinate values before and after the set time, coordinates of, for example, a midpoint of these coordinate values is estimated to be the coordinates of the undetermined camera at the set time.

Also, although the data judgement unit 54 discards the piece of relative information in the step S101 in the first embodiment above, the data judgement unit 54 does not have to discard it. In this case, when apiece of relative position information 60 is updated by interpolation as described above, the updated piece of relative position information 60 may be further updated, based on the undiscarded piece of relative information and the updated piece of relative position information 60.

(8) Others

Additionally, more than one camera may be set as the reference cameras, and a piece of relative position information 60 may be generated and held for each reference camera.

Additionally, the data processing apparatus according to the present invention may further include a ranging sensor or the like, and based on positional relationships among cameras worn by three users, which have been calculated with use of the positional relationship calculation method according to the present invention, may calculate positions of other cameras using triangulation based on the calculated three positions.

Also, the data processing apparatus according to the present invention may further include an acceleration sensor or the like, and based on positional relationships among cameras worn by users, which have been calculated with use of the positional relationship calculation method according to the present invention, may calculate positional relationships among cameras by calculating moving paths from the calculated positional relationships.

<Additional Remarks>

Although the data processing apparatus of the present invention is described above based on the embodiments, it may be modified in the following manners. It should be noted that the present invention is not confined to the data processing apparatus illustrated in the above embodiments.

(1) Each of the above-mentioned devices, specifically, is a computer system including a microprocessor, a ROM, a RAM, a hard disk unit, a display unit, a keyboard, a mouse, and the like. Computer programs are stored in the ROM, RAM, or hard disk unit, and each device achieves its predetermined functions as the microprocessor operates in accordance with the computer programs. Here, each computer program is composed of a plurality of command codes that show instructions with respects to the computer, for achieving the predetermined functions. It should be noted that each of the above-mentioned devices is not limited to a computer system including all of a microprocessor, a ROM, a RAM, a hard disk unit, a display unit, a keyboard, a mouse, and the like, but can be a computer system including part of these.

(2) All or part of the compositional elements of each apparatus may be composed from one system LSI (Large Scale Integration). The system LSI is a super-multifunctional LSI on which a plurality of compositional units are manufactured integrated on one chip, and is specifically a computer system that includes a microprocessor, a ROM, a RAM, or the like. Computer programs are stored in the RAM. The LSI achieves its functions by the microprocessor operating according to the computer programs.

Here, the LSI may be an IC, a system LSI, a super LSI, or ultra LSI, depending on the degree of integration. Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

Furthermore, if a semiconductor technology or related technologies give birth to a new circuit-integrating technology that would replace the LSI, such technologies may be used for integrating the functional blocks. One such possibility is an application of biotechnology.

(3) Part or all of the compositional elements of each device may be composed of a removable IC card or a single module. The IC card or the module is a computer system composed of a microprocessor, a ROM, a RAM, or the like. The IC card or the module may include the aforementioned super-multifunctional LSI. The IC card or the module may achieve its functions by the microprocessor operating according to computer programs. The IC card or the module may be tamper-resistant.

(4) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the digital signal recorded in any of the aforementioned recording medium apparatuses.

Furthermore, the present invention may be the computer program or the digital signal transmitted on an electric communication network, a wireless or wired communication network, or a network of which the Internet is representative.

Also, the present invention may be a computer system including a microprocessor and a memory, whereby the memory stores the computer program, and the microprocessor operates in accordance with the computer program.

Furthermore, by transferring the program or the digital signal to the recording medium, or by transferring the program or the digital signal via a network or the like, the program or the digital signal may be executed by another independent computer system.

(5) The present invention may be any combination of the above-described embodiments and modifications.

Industrial Applicability

The data processing apparatus pertaining to the present invention is useful as a technique to, by making use of a feature that a plurality of users each wear a camera, detect positional relationships among the users, and based on the detected positional relationships among the users, construct an interface for making a selection with respect to images captured by the cameras worn by the users.

The invention claimed is:

1. A data processing apparatus for managing a positional relationship among a plurality of cameras that are related to one another by performing image capturing so that each of the plurality of cameras captures an image of another one or more of the plurality of cameras, the data processing apparatus comprising:

a captured image acquisition unit operable to acquire a plurality of different pieces of captured image data which have been captured by the plurality of cameras;

an image recognition unit operable to perform image recognition processing on each of the pieces of captured image data to detect one or more predetermined pieces of detection target data each for identifying a captured camera, the captured camera being captured in the piece of captured image data which has been captured by a capturing camera, and the captured camera and the capturing camera being included in the plurality of cameras;

a calculation unit operable to obtain, for each of the detected pieces of detection target data, by performing calculation based on the piece of detection target data, a piece of relative information indicating coordinates and a capturing direction of a position-specified camera in a coordinate system of an origin camera, the origin camera being one of the capturing camera and the captured camera, and the position-specified camera being another one of the capturing camera and the captured camera;

a judgement unit operable to judge, for each piece of relative information, whether the piece of relative information is to be converted to a piece of information which uses a coordinate system of a reference camera among the plurality of cameras;

a relative information conversion operation unit operable to perform the conversion in accordance with a result of the judgement by the judgement unit; and a relative position information management unit operable to aggregate, (a) among the obtained pieces of relative information, each unconverted piece of relative information which uses the coordinate system of the reference camera, and (b) the converted pieces of relative information, thereby generating a piece of relative position information indicating coordinates and a capturing direction of each of the plurality of cameras in the coordinate system of the reference camera.

2. The data processing apparatus of claim 1, wherein the judgement unit judges whether the piece of relative information uses the coordinate system of the reference camera, and if the judgement is negative and at least one of the capturing camera and the captured camera satisfies a predetermined condition, the judgement unit judges that the conversion is to be performed.

3. The data processing apparatus of claim 2, wherein the relative position information management unit holds the piece of relative position information and updates the held piece of relative position information by sequentially receiving, for each of the plurality of cameras, a piece of reference information indicating coordinates and a capturing direction of the camera in the coordinate system of the reference camera, the judgement unit includes a data management unit operable to hold the obtained pieces of relative information, and the judgement unit sequentially reads each piece of relative information held by the data management unit, and if both of the capturing camera and the captured camera of the read piece of relative information are none of (a) the reference camera and (b) any camera, among the plurality of cameras, for which no piece of reference information is registered in the piece of relative position information, the judgement unit returns the read piece of relative information to the data management unit.

4. The data processing apparatus of claim 1, wherein
the relative position information management unit holds the piece of relative position information and updates the held piece of relative position information by sequentially receiving, for each of the plurality of cameras, a piece of reference information indicating coordinates and a capturing direction of the camera in the coordinate system of the reference camera, and the judgement unit registers, as the piece of reference information, a positional relationship between the capturing camera and the captured camera indicated in the piece of relative information if (i) the origin camera is the reference camera and (ii) no piece of reference information is registered for the position-specified camera in the piece of relative position information.

5. The data processing apparatus of claim 4, wherein
the judgement unit discards the piece of relative information without adding the piece of relative information to the piece of relative position information if (i) the origin camera is the reference camera and (ii) the piece of reference information for the position-specified camera is registered in the piece of relative position information.

6. The data processing apparatus of claim 2, wherein
the relative position information management unit holds the piece of relative position information and updates the held piece of relative position information by sequentially receiving, for each of the plurality of cameras, a piece of reference information indicating coordinates and a capturing direction of the camera in the coordinate system of the reference camera, and the judgement unit judges that the conversion is to be performed if (i) the piece of reference information for the origin camera is registered in the piece of relative position information and (ii) the position-specified camera is not the reference camera.

7. The data processing apparatus of claim 6, wherein
the relative information conversion operation unit converts, with use of a positional relationship between the reference camera and the origin camera indicated in the piece of reference information, the piece of relative information to the piece of information indicating coordinates and/or a capturing direction of the position-specified camera in the coordinate system of the reference camera.

8. The data processing apparatus of claim 6, wherein
the judgement unit discards the piece of relative information without adding the piece of relative information to the piece of relative position information if (i) the piece of reference information for the origin camera is registered in the piece of relative position information and (ii) the position-specified camera is the reference camera.

9. The data processing apparatus of claim 2, wherein
the relative position information management unit holds the piece of relative position information and updates the held piece of relative position information by sequentially receiving, for each of the plurality of cameras, a piece of reference information indicating coordinates and a capturing direction of the camera in the coordinate system of the reference camera, and the judgement unit judges that the conversion is to be performed if (i) the position-specified camera is the reference camera and (ii) no piece of reference information is registered for the origin camera in the piece of relative position information.

10. The data processing apparatus of claim 9, wherein
the relative information conversion operation unit converts the piece of relative information to the piece of information indicating coordinates and/or a capturing direction of the original camera in the coordinate system of the reference camera, by calculating an inverse vector of a positional relationship between the origin camera and the position-specified camera indicated in the piece of relative information.

11. The data processing apparatus of claim 2, wherein
the relative position information management unit holds the piece of relative position information and updates the held piece of relative position information by sequentially receiving, for each of the plurality of cameras, a piece of reference information indicating coordinates and a capturing direction of the camera based on the coordinate system of the reference camera, and the judgement unit judges that the conversion is to be performed if (i) the origin camera is not the reference camera and (ii) the piece of reference information for the position-specified camera of the piece of relative information is registered in the relative position information.

12. The data processing apparatus of claim 11, wherein
the relative information conversion operation unit converts the piece of relative information to the information indicating coordinates and a capturing direction of the origin camera in the coordinate system of the reference camera, by performing a vector operation using (a) a positional relationship between the position-specified camera and the original camera indicated in the piece of reference information and (b) a positional relationship between the capturing camera and the captured camera indicated in the piece of relative information.

13. The data processing apparatus of claim 1, further comprising:
an image selection support unit operable to generate, based on the generated piece of relative position information, image data indicating coordinates and a capturing direction of each of the plurality of cameras in the coordinate system of the reference camera, and causes, with use of the generated image data, a display unit to display a user interface for making a selection with respect to the plurality of pieces of captured image data.

14. The data processing apparatus of claim 13, wherein
the user interface includes:
a camera positional relationship display area for displaying the generated image data; and
a captured image display area for displaying one of the plurality of pieces of captured image data which has been captured by a camera selected via the user interface, and the image selection support unit includes:
a position specification unit operable to specify a position, in the displayed piece of captured image data, of a camera located within an image-capturing range of the capturing camera of the displayed piece of captured image data; and an overlay display unit operable to overlay a camera identification image, which is for identifying the camera, on top of the piece of captured image data so as to display the camera identification image at a position determined based on the specified position.

15. The data processing apparatus of claim 14, wherein the image selection support unit, upon receiving an operation of selecting the overlaid camera identification image, displays, in the captured image display area, the captured image which has been captured by the camera identified by the selected camera identification image.

16. The data processing apparatus of claim 14, wherein the overlay display unit assigns different colors to the plurality of cameras, respectively, and overlays a camera identification image of each of the plurality of cameras, using a color assigned to the camera, on top of the camera, and the image selection support unit generates the image data such that each camera identification image indicating a respective one of the plurality of cameras is displayed in a visually distinct manner by the color assigned to the camera.

17. The data processing apparatus of claim 14, wherein the overlay display unit displays the camera identification image in a mode in accordance with a distance between the camera indicated by the camera identification image and the capturing camera which captured the captured image data such that the distance is visually distinct.

18. The data processing apparatus of claim 14, wherein the position specification unit performs the specification based on (i) at least one of (a) coordinates and a capturing direction of each of the plurality of cameras indicated in the relative position information whose reference camera is the capturing camera of the displayed captured image data and (b) the piece of relative information whose origin camera is the capturing camera and (ii) capturing range information indicating the image-capturing range of the capturing camera.

19. The data processing apparatus of claim 18, wherein the position specification unit judges whether each camera within the image-capturing range is (a) the captured camera whose image has been captured in the captured image data or (b) an uncaptured camera whose image has not been captured in the captured image data, based on the coordinates of each of the plurality of cameras indicated in the relative position information, and the overlay display unit overlays, for display, the camera identification image in a manner that each camera within the image-capturing range is visually distinguishable between the captured camera and the hidden camera.

20. The data processing apparatus of claim 1, wherein the relative position information management unit holds the piece of relative position information and updates the held piece of relative position information by sequentially receiving, for each of the plurality of cameras, a piece of reference information indicating coordinates and a capturing direction of the camera based on the coordinate system of the reference camera, and the data processing apparatus generates a piece of relative position information at each predetermined time, and in a case the plurality of cameras include an undetermined camera for which no piece of reference information exists in the piece of relative position information at the predetermined time, interpolates coordinates and a capturing direction of the undetermined camera in the coordinate system of the reference camera at the predetermined time, in accordance with (a) coordinates and a capturing direction of the undetermined camera in the coordinate system of the reference camera indicated in a piece of relative information at a time prior to the predetermined time and (b) coordinates and a capturing direction of the undetermined camera in the coordinate system of the reference camera indicated in a piece of relative information at a time subsequent to the predetermined time.

21. A data processing method for managing a positional relationship among a plurality of cameras that are related to one another by performing image capturing so that each of the plurality of cameras captures an image of another one or more of the plurality of cameras, the data processing method comprising:

a captured image acquiring step of acquiring a plurality of different pieces of captured image data which have been captured by the plurality of cameras;

an image recognizing step of performing image recognition processing on each of the pieces of captured image data to detect one or more predetermined pieces of detection target data each for identifying a captured camera, the captured camera being captured in the piece of captured image data which has been captured by a capturing camera, and the captured camera and the capturing camera being included in the plurality of cameras;

a calculating step of obtaining, for each of the detected pieces of detection target data, by performing calculation based on the piece of detection target data, a piece of relative information indicating coordinates and a capturing direction of a position-specified camera in a coordinate system of an origin camera, the origin camera being one of the capturing camera and the captured camera, and the position-specified camera being an other one of the capturing camera and the captured camera;

a judging step of judging, for each piece of relative information, whether the piece of relative information is to be converted to a piece of information which uses a coordinate system of a reference camera among the plurality of cameras;

a relative information conversion operating step of performing the conversion in accordance with a result of the judgement in the judging step; and a relative position information managing step of aggregating, (a) among the obtained pieces of relative information, each unconverted piece of relative information which uses the coordinate system of the reference camera, and (b) the converted pieces of relative information, thereby generating a piece of relative position information indicating coordinates and a capturing direction of each of the plurality of cameras in the coordinate system of the reference camera.

22. A non-transitory computer-readable recoding medium having recorded thereon a control program for causing a data processing apparatus to execute steps for managing a positional relationship among a plurality of cameras that are related to one another by performing image capturing so that each of the plurality of cameras captures an image of another one or more of the plurality of cameras, the control program including:

a captured image acquiring step of acquiring a plurality of different pieces of captured image data which have been captured by the plurality of cameras;

an image recognizing step of performing image recognition processing on each of the pieces of captured image data to detect one or more predetermined pieces of detection target data each for identifying a captured camera, the captured camera being captured in the piece of captured image data which has been captured by a capturing camera, and the captured camera and the capturing camera being included in the plurality of cameras;

a calculating step of obtaining, for each of the detected pieces of detection target data, by performing calculation based on the piece of detection target data, a piece of relative information indicating coordinates and a capturing direction of a position-specified camera in a coordinate system of an origin camera, the origin camera being one of the capturing camera and the captured camera, and the position-specified camera being an other one of the capturing camera and the captured camera;

a judging step of judging, for each piece of relative information, whether the piece of relative information is to be converted to a piece of information which uses a coordinate system of a reference camera among the plurality of cameras;

a relative information conversion operating step of performing the conversion in accordance with a result of the judgement in the judging step; and a relative position information managing step of aggregating, (a) among the obtained pieces of relative information, each unconverted piece of relative information which uses the coordinate system of the reference camera, and (b) the converted pieces of relative information, thereby generating a piece of relative position information indicating coordinates and a capturing direction of each of the plurality of cameras in the coordinate system of the reference camera.

\* \* \* \* \*